United States Patent
Fang et al.

(10) Patent No.: US 12,423,856 B2
(45) Date of Patent: Sep. 23, 2025

(54) METHOD AND APPARATUS FOR DETERMINING LOCATIONS OF WIRELESS CAMERAS

(71) Applicant: The Board of Regents of the University of Oklahoma, Norman, OK (US)

(72) Inventors: Song Fang, Norman, OK (US); Yan He, Norman, OK (US); Qiuye He, Norman, OK (US)

(73) Assignee: The Board of Regents of the University of Oklahoma, Norman, OK (US)

( * ) Notice: Subject to any disclaimer, the term of this patent is extended or adjusted under 35 U.S.C. 154(b) by 354 days.

(21) Appl. No.: 18/341,567

(22) Filed: Jun. 26, 2023

(65) Prior Publication Data

US 2023/0419534 A1 Dec. 28, 2023

Related U.S. Application Data

(60) Provisional application No. 63/356,211, filed on Jun. 28, 2022.

(51) Int. Cl.
*G06T 7/70* (2017.01)
*G06F 3/01* (2006.01)
*H04L 9/40* (2022.01)

(52) U.S. Cl.
CPC .............. *G06T 7/70* (2017.01); *G06F 3/017* (2013.01); *H04L 63/0876* (2013.01)

(58) Field of Classification Search
CPC .............................. G06T 7/70; H04L 63/0876
(Continued)

(56) References Cited

U.S. PATENT DOCUMENTS

2007/0087763 A1* 4/2007 Budampati ........... H04W 12/08
 455/456.5
2013/0344901 A1* 12/2013 Garin ..................... G01S 5/021
 455/456.6

(Continued)

OTHER PUBLICATIONS

Arlo Pro 2, https://www.arlo.com/en-us/products/arlo-pro-2/default.aspx, 2020, 2 pages.
(Continued)

*Primary Examiner* — Gabriel I Garcia
(74) *Attorney, Agent, or Firm* — Conley Rose, P.C.

(57) ABSTRACT

A method is for detecting and localizing a wireless camera in an environment suspected to contain the wireless camera. The method comprises: instructing a user to perform a predetermined motion in the environment, wherein the predetermined motion is detectable within a detection range of a motion sensor of the wireless camera; scanning for and collecting a wireless traffic flow in the environment via a sniffing device; analyzing the wireless traffic flow to identify an OUI; comparing the OUI to an existing public OUI database to determine if the wireless traffic flow is generated by the wireless camera; when the wireless traffic flow is determined to have been generated by the wireless camera, concluding that the wireless camera is present in the environment; calculating a path distance of the predetermined motion when the wireless camera has been determined to be present in the environment; using a model to determine if the user performing the predetermined motion was in the detection range; and when the user is determined to have been in the detection range, determining a specific location of the wireless camera in the environment based on the path distance of the predetermined motion.

20 Claims, 31 Drawing Sheets

(58) Field of Classification Search
USPC .......................................................... 382/103
See application file for complete search history.

(56) References Cited

U.S. PATENT DOCUMENTS

2017/0013445 A1* 1/2017 Raman ................. H04L 63/1458
2021/0029543 A1* 1/2021 Nam ..................... H04W 80/12

OTHER PUBLICATIONS

Arlo Ultra: 4K security camera: 4K wireless camera system, https://www.arlo.com/en-us/products/arlo-ultra/default.aspx, 2020, 6 pages.
Blink XT2 system bundles, https://blinkforhome.com/collections/blink-xt2-outdoor-cameras, 2020, 3 pages.
Smart WiFi motion sensor, https://www.bazzsmarthome.com/products/smart-wifi-motion-sensor, 2020, 5 pages.
What are activity zones and how do I create them, https://kb.arlo.com/ 1001908/What-are-activity-zones-and-how-do-I-create-them, 2020, 1 page.
Abas, K., et al., "Wireless Smart Camera Networks for the Surveillance of Public Spaces," IEEE Computer Society, 47(5):37-44, 2014, 8 pages.
Aircrack-ng. Main documentation—aircrack-ng suite, https:// www.aircrack-ng.org/documentation.html, 2020, 1 page.
Arlo Technologies, Inc. Arlo Pro 2 HD security camera system user manual, https://www.arlo.com/en-us/images/Documents/ArloPro2/arlo_pro_2_um.pdf, Feb. 2019, 85 pages.
Cheng, Y., et al., "DeWiCam: Detecting Hidden Wireless Cameras via Smartphones," In Proceedings of the 2018 on Asia Conference on Computer and Communications Security, ASIACCS "18, pp. 1-13, New York, NY, USA, 2018, 13 pages.
Cheng, Y., et al., "On Detecting Hidden Wireless Cameras: A Traffic Pattern-based Approach," IEEE Transactions on Mobile Computing, vol. 19 No. 4, Apr. 2020, 15 pages.
Conti, M., et al., "Can't you Hear Me Knocking: Identification of User Actions on Android Apps via Traffic Analysis," In Proceedings of the 5th ACM Conference on Data and Application Security and Privacy, pp. 297-304, 2015, 8 pages.
Crow, B., et al., "IEEE 802.11 Wireless Local Area Networks," IEEE Communications Magazine, 35(9):116-126, Sep. 1997, 11 pages.
Fleishman, G. "Take Control of Home Security Cameras," Take Control Books, San Diego, CA, USA, 2020, 201 pages.
Hafeez, I., et al., "IoT-keeper: Detecting Malicious IoT Network Activity Using Online Traffic Analysis at the Edge," IEEE Transactions on Network and Service Management, 17(1):45-59, 2020, 15 pages.
Hiertz, G., "The IEEE 802.11 Universe," IEEE Communications Magazine, 48(1):62-70, Jan. 2010, 9 pages.
Iboshi, K., et al., "We asked 86 burglars how they broke into homes," https://www.ktvb.com/article/news/crime/we-asked-86-burglars-how-they-broke-into-homes/277-344333696, 2017, 5 pages.
IEEE. OUI public listing, http://standards-oui.ieee.org/oui/oui.txt, Jun. 14, 2022, 3503 pages.
IPX1031. Survey: Do Airbnb guests trust their hosts, https://www.ipx1031.com/airbnb-guests-trust-hosts/, Apr. 2019, 2 pages.
Ji, X., et al., "User Presence Inference via Encrypted Traffic of Wireless Camera in Smart Homes," Security and Communication Networks, 2018:1-10, Sep. 25, 2018, 11 pages.
Lakshmanan, M., et al., "Surfi: Detecting Surveillance Camera Looping Attacks with Wi-Fi Channel State Information," In Proceedings of the 12th Conference on Security and Privacy in Wireless and Mobile Networks, WiSec "19, p. 239-244, New York, NY, USA, Association for Computing Machinery, May 15-17, 2019, 6 pages.
Li, A., "Security Camera Blind Spots: How to Find and avoid Them," https://reolink.com/find-and-avoid-security-camera-blind-spots/, Nov. 2018, 1 page.
Li, Z., et al., "Adversarial Localization against Wireless Cameras," In Proceedings of the 19th International Workshop on Mobile Computing Systems Applications, HotMobile "18, pp. 87-92, New York, NY, USA, Feb. 12-13, 2018, 6 pages.
Liu, H., "Turning a pyroelectric infrared motion sensor into a high-accuracy presence detector by using a narrow semi-transparent chopper," Applied Physics Letters, 111(24):243901, 2017, 6 pages.
Liu, T., et al., "Detecting Wireless Spy Cameras via Stimulating and Probing," In Proceedings of the 16th Annual International Conference on Mobile Systems, Applications, and Services, MobiSys "18, pp. 243-255, New York, NY, USA, 2018, 13 pages.
Mare, S., et al., "Smart Devices in Airbnbs: Considering Privacy and Security for both Guests and Hosts," Proceedings on Privacy Enhancing Technologies, 2020(2):436-458, 2020, 23 pages.
Market Research Future, "Global Wireless Monitoring and Surveillance Market," https://www.marketresearchfuture.com/reports/wireless-monitoring- surveillance-market-975, 2020, 2 pages.
Martin, J., et al., "A Study of Mac Address Randomization in Mobile Devices and When it Fails," Proceedings on Privacy Enhancing Technologies, 2017(4):365-383, Mar. 31, 2017, 23 pages.
Martin, J., et al., "Decomposition of MAC Address Structure for Granular Device Inference," In Proceedings of the 32nd Annual Conference on Computer Security Applications, ACSAC "16, p. 78-88, New York, NY, USA, Dec. 5-9, 2016, 11 pages.
Mitev, R., et al., "Leakypick: IoT Audio Spy Detector," arXiv preprint arXiv:2007.00500, Dec. 7-11, 2020, 12 pages.
Narayana, S., et al., "PIR sensors: Characterization and Novel Localization Technique," In Proceedings of the 14th International Conference on Information Processing in Sensor Networks, IPSN "15, p. 142-153, New York, NY, USA, Association for Computing Machinery, Apr. 14-16, 2015, 12 pages.
Nguyen, P., "Matthan: Drone Presence Detection by Identifying Physical Signatures in the Drone's RF Communication," In Proceedings of the 15th Annual International Conference on Mobile Systems, Applications, and Services, MobiSys "17, p. 211-224, New York, NY, USA, Association for Computing Machinery, Jun. 19-23, 2017, 14 pages.
Offensive Security. Kali Linux NetHunter, https://www.kali.org/kali-linuxnethunter/, 2020, 5 pages.
Reolink. "How to turn on/off the PIR Sensor," https://support.reolink.com/ hc/en-us/articles/360004379493-Turn-on-off-the-PIR-sensor, 2020, 1 page.
Scarfone, K., "Guide to securing legacy IEEE 802.11 Wireless Networks," National Institute of Standards and Technology (NIST) Special Publication, 800:48, 2008, 50 pages.
Sciancalepore, S., PiNcH: an Effective, Efficient, and Robust Solution to Drone Detection via Network Traffic Analysis, Computer Networks, 168:107044, Dec. 7, 2019, 47 pages.
Taylor, V. F., "Robust Smartphone App Identification via Encrypted Network Traffic Analysis.," IEEE Transactions on Information Forensics and Security, 13(1):63-78, Jan. 2018, 16 pages.
Vanhoef, M., et al., "Why MAC Address Randomization is not Enough: An Analysis of Wi-Fi Network Discovery Mechanisms," In Proceedings of the 11th ACM on Asia Conference on Computer and Communications Security, pp. 413-424, May 30-Jun. 3, 2016, 12 pages.
Wang, Q., "I Know What You Did on Your Smartphone: Inferring App Usage Over Encrypted Data Traffic," In 2015 IEEE Conference on Communications and Network Security (CNS), pp. 433-441, 2015, 9 pages.
Wu, K., "Do You See What I See? Detecting Hidden Streaming Cameras Through Similarity of Simultaneous Observation," In 2019 IEEE International Conference on Pervasive Computing and Communications (PerCom), pp. 1-10, 2019, 10 pages.
Xiao, L., et al., "IoT Security Techniques Based on Machine Learning: How do IoT devices use AI to enhance security?," IEEE Signal Processing Magazine, 35(5):41-49, 2018, 9 pages.
Ye, Y., et al., "Wireless Video Surveillance: A Survey," IEEE Access, 1:646-660, 2013, 15 pages.
Zhang, W., "Homonit: Monitoring Smart Home Apps from Encrypted Traffic," In Proceedings of the 2018 ACM SIGSAC Conference on Computer and Communications Security, CCS "18, p. 1074-1088, New York, NY, USA, Association for Computing Machinery, Oct. 15-19, 2018, 15 pages.

(56) References Cited

OTHER PUBLICATIONS

"Part 11: Wireless LAN Medium Access Control (MAC) and Physical Layer (PHY) Specifications," IEEE Standard for Information technology—Telecommunications and information exchange between systems Local and metropolitan area networks—Specific requirements, 2016, 3534 pages.

* cited by examiner

METHOD AND APPARATUS FOR DETERMINING LOCATIONS OF WIRELESS CAMERAS

CROSS-REFERENCE TO RELATED APPLICATIONS

This claims priority to U.S. Prov. Patent App. No. 63/356,211 filed on Jun. 28, 2022, which is incorporated by reference.

STATEMENT REGARDING FEDERALLY SPONSORED RESEARCH OR DEVELOPMENT

This invention was made with government support under Grant No. 1948547 from the National Science Foundation. The government has certain rights in the invention.

BACKGROUND

Due to their flexibility and greatly simplified installation, wireless security cameras are becoming more widely deployed than traditional wired cameras to monitor and report trespassing or other unauthorized activity. In the latest study conducted by Market Research Future in 2020, it is forecasted that the global wireless video monitoring and surveillance market will increase at a high annual growth rate of 16.85% over 2017 to 2023.

Some wireless security cameras are made visible as a deterrence measure, but that visibility may mean (1) they are more susceptible to damage or theft; (2) burglars may become more interested in breaking in as they think the camera signals that there are valuables inside the property; (3) it is easier to avoid being recorded, e.g., an adversary may find the blind spots (i.e., areas not within the peripheral vision of the camera) and leverage them to evade being recorded. For these reasons, people may install wireless cameras inconspicuously. They are thus naturally attractive targets to adversaries who want to bypass the surveillance.

The rapid proliferation of wireless cameras also brings privacy concerns associated with unauthorized video recording, especially considering the progressively smaller size of spy cameras. These cameras can be easily hidden such that their targets are unaware of their existence. For example, according to a survey of 2,023 Airbnb guests that was conducted in 2019, 58% of them were concerned that property owners might install hidden cameras inside their rooms, and meanwhile as high as 11% said that they had discovered a hidden camera in their Airbnb. Thus, detection of wireless cameras is drawing increasing attention for privacy protection.

Traditional ways to detect a wireless camera mainly include Radio Frequency (RF) scanning, lens detection, and physical search. The latter two methods are cumbersome as they require inspection of every corner of the target area. RF scanning may work when the camera is actively transmitting, but current methods can only detect the existence of wireless cameras, not their exact locations.

Personal privacy is improved by identifying if a wireless camera exists in various locations, such as hotel rooms, Airbnb rentals, and office buildings. However, detection is not sufficient on its own, as the camera owner may claim it is somewhere outside of the room or installed by another. It can be important to pinpoint the locations of hidden wireless cameras. For example, a victim whose privacy is violated can obtain direct and solid evidence by finding the physical camera that records. Moreover, this localization technique can be a two-edged sword in that it can also be utilized by malicious users such as a burglar localizing a home's security camera in order to avoid its field of view or otherwise physically disarm it.

A great portion of wireless cameras are equipped with built-in motion sensors (e.g., Amazon Blink XT2 and Arlo Pro 2). Because of the volume of data collected by wireless cameras, wireless cameras remain in standby mode until movement is detected, at which point the camera turns on and starts recording, uploading captured video to the cloud backend server and sending a notification to the property owner. The network correspondingly exhibits sudden high wireless traffic, as shown in FIG. 1. The camera will then continue to record until the motion stops. After that, it reverts to standby mode. As wireless security cameras installed at different locations have different coverage areas, one can then determine the camera's coverage area to find the location of the camera. Specifically, motion is induced at a spot (e.g., by using an assistant to walk nearby or utilizing a moving robot/drone). If correspondingly high wireless traffic is observed, one can surmise that this spot may be monitored by a camera, and the camera's possible area may be determined accordingly. With customized motion trajectories, the location of the camera can be pinpointed.

In practice, however, there exist other different types of wireless traffic flows generated by non-camera devices, such as laptops, smartphones, or tablets. Thus, it is challenging to distinguish which traffic flows belong to wireless cameras, especially considering that the wireless local area networks (WLANs) employ encryption techniques such as Wired Equivalent Privacy (WEP), Wi-Fi Protected Access (WPA), and Wi-Fi Protected Access 2 (WPA2) to prevent information compromise from casual eavesdropping. It is to address this challenge that the present disclosure is directed.

BRIEF DESCRIPTION OF THE DRAWINGS

Several embodiments of the present disclosure are hereby illustrated in the appended drawings. It is to be noted that the appended drawings only illustrate several typical embodiments and are therefore not intended to be considered limiting of the scope of the present disclosure. Further, in the appended drawings, like or identical reference numerals or letters may be used to identify common or similar elements and not all such elements may be so numbered. The figures are not necessarily to scale and certain features and views of the figures may be shown as exaggerated in scale or in schematic in the interest of clarity and conciseness.

DETAILED DESCRIPTION

Figure 1:
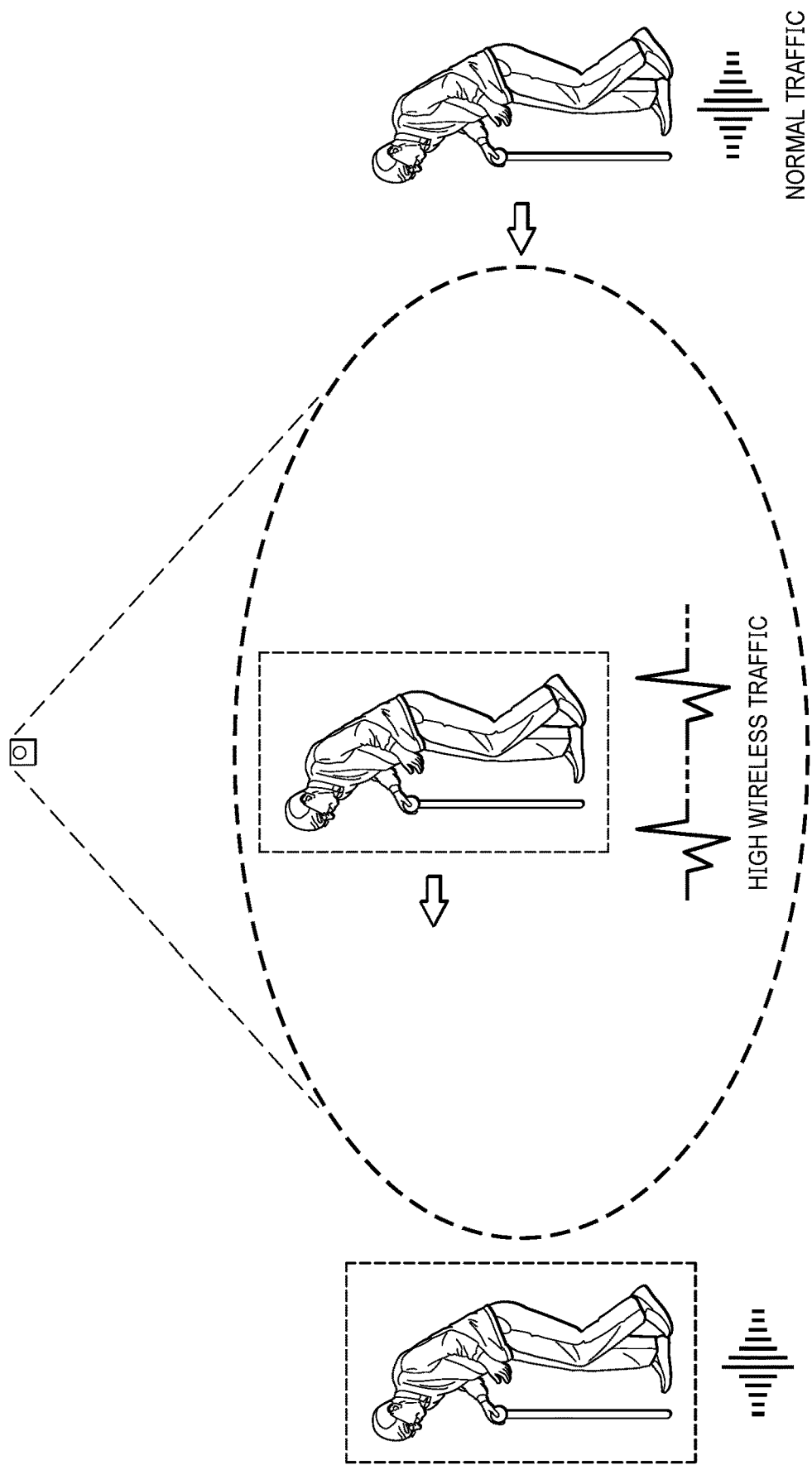
FIG. 1 depicts a motion-activated wireless camera.

The present disclosure describes a system referred to herein as MotionCompass, which is a lightweight technique for pinpointing the location ("localization") of a motion-activated wireless camera, indoors or outdoors. Wireless traffic is stimulated by specifically designed motion, and is analyzed, enabling the localization of the wireless camera. By generating customized movement which stimulates the camera to emit wireless traffic, and correlating the motion trajectory with observed wireless traffic, MotionCompass can achieve robust camera localization. An Android app was developed to implement MotionCompass, and to verify its effectiveness and efficiency via extensive real-world experiments.

Almost all current commodity network devices deploy 802.11 wireless protocols, in which an inherent weakness has been found, i.e., exposure of link-layer MAC addresses. Each MAC address, which is a persistent globally unique identifier, discloses the device manufacturer information via the first three most significant MAC bytes, i.e., the organizationally unique identifier (OUI). The OUI of MAC addresses can be utilized to detect the presence of wireless camera traffic. Because OUI relies on the camera manufacturers and the main-stream manufacturers of wireless cameras, which are limited, a table of OUIs associated with wireless cameras can be prebuilt. Next, with a captured MAC address, we compare its OUI with each entry in the table. If a match is found, we assume that the wireless traffic with this specific MAC address is generated by a wireless camera. While MAC address eavesdropping and analysis can reveal the existence of wireless cameras, it is unable to reveal their exact locations. Thus, another challenge is how to design the motion stimulation so that the camera location can be found. To address this problem, we can correlate the range of arbitrarily generated motion with the camera location. In particular, we have designed novel strategies to first set up a coordinate system and then compute the camera's coordinates for determining its location, providing a practical approach to pinpoint the location of a motion-activated wireless camera. The technique can be carried out with a single smartphone, and needs neither professional equipment nor connecting to the same network with the target camera. The method, referred to elsewhere herein as MotionCompass, exploits how a motion sensor can act as a compass to guide us to pinpoint the wireless camera by correlating the manipulated motion with the resultant wireless traffic generated by the camera.

Before describing various embodiments in more detail by way of exemplary description, examples, and results, it is to be understood that the present disclosure is not limited in application to the details of methods and compositions as set forth in the following description. The disclosure is capable of other embodiments or of being practiced or carried out in various ways. As such, the language used herein is intended to be given the broadest possible scope and meaning; and the embodiments are meant to be exemplary, not exhaustive. Also, it is to be understood that the phraseology and terminology employed herein is for the purpose of description and should not be regarded as limiting unless otherwise indicated as so. Moreover, in the following detailed description, numerous specific details are set forth in order to provide a more thorough understanding of the disclosure. However, it will be apparent to a person having ordinary skill in the art that the presently disclosed concepts may be practiced without these specific details. In other instances, features that are well known to persons of ordinary skill in the art have not been described in detail to avoid unnecessary complication of the description.

Unless otherwise defined herein, scientific and technical terms used herein shall have the meanings that are commonly understood by those having ordinary skill in the art. Further, unless otherwise required by context, singular terms shall include pluralities and plural terms shall include the singular.

All patents, published patent applications, and non-patent publications mentioned in the specification are indicative of the level of skill of those skilled in the art to which the present disclosure pertains. All patents, published patent applications, and non-patent publications referenced in any portion of this application are herein expressly incorporated by reference in their entirety to the same extent as if each individual patent or publication was specifically and individually indicated to be incorporated by reference.

All of the systems and methods of production and application thereof disclosed herein can be made and executed without undue experimentation in light of the present disclosure. While the systems and methods of the present disclosure have been described in terms of particular embodiments, it will be apparent to those of skill in the art that variations may be applied to the systems and/or methods and in the steps or in the sequence of steps of the method described herein without departing from the concept, spirit and scope of the inventive concepts. All such similar substitutes and modifications apparent to those of skilled in the art are deemed to be within the spirit and scope of the inventive concepts disclosed herein.

As utilized in accordance with the methods and compositions of the present disclosure, the following terms, unless otherwise indicated, shall be understood to have the following meanings:

The use of the word "a" or "an" when used in conjunction with the term "comprising" in the claims and/or the specification may mean "one", but it is also consistent with the meaning of "one or more", "at least one", and "one or more than one". The use of the term "or" in the claims is used to mean "and/or" unless explicitly indicated to refer to alternatives only or when the alternatives are mutually exclusive, although the disclosure supports a definition that refers to only alternatives and "and/or". The use of the term "at least one" will be understood to include one as well as any quantity more than one, including but not limited to, 2, 3, 4, 5, 6, 7, 8, 9, 10, 11, 12, 13, 14, 15, 16, 17, 18, 19, 20, 21, 22, 23, 24, 25, 30, 35, 40, 45, 50, 55, 60, 65, 70, 75, 80, 85, 90, 95, 100, or more, or any integer inclusive therein. The term "at least one" may extend up to 1000 or more, depending on the term to which it is attached; in addition, the quantities of 100/1000 are not to be considered limiting, as higher limits may also produce satisfactory results. In addition, the use of the term "at least one of X, Y, and Z" will be understood to include X alone, Y alone, and Z alone, as well as any combination of X, Y, and Z.

As used in this specification and claims, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. For example, unless otherwise noted, a process, method, article, or apparatus that comprises a list of elements is not necessarily limited to only those elements, but may also include elements not expressly listed or inherent to such process, method, article or apparatus.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

Throughout this application, the terms "about" or "approximately" are used to indicate that a value includes the inherent variation of error for the device, system, components, or method, or the variation that exists among the study subjects. Further, in this detailed description and the appended claims, each numerical value (e.g., error, time, distance, angle) should be read once as modified by the term "about" or "approximately" (unless already expressly so modified), and then read again as not so modified unless otherwise indicated in context. For example but not by way of limitation, when the term "about" or "approximately" is utilized, the designated value may vary by plus or minus 20 percent, plus or minus 15 percent, plus or minus 12 percent, or plus or minus 11 percent, or plus or minus ten percent, or plus or minus nine percent, or plus or minus eight percent, or plus or minus seven percent, or plus or minus six percent, or plus or minus five percent, or plus or minus four percent, or plus or minus three percent, or plus or minus two percent, or plus or minus one percent, or plus or minus one-half percent.

Also, any range listed or described herein is intended to include, implicitly or explicitly, any number within the range, particularly all integers, including the end points, and is to be considered as having been so stated. For example, "a range from 1 to 10" is to be read as indicating each possible number, particularly integers, along the continuum between about 1 and about 10, including for example 2, 3, 4, 5, 6, 7, 8, and 9. Similarly, fractional amounts between any two consecutive integers are intended to be included herein, such as, but not limited to, 0.05, 0.1, 0.15, 0.2, 0.25, 0.3, 0.35, 0.4, 0.45, 0.5, 0.55, 0.6, 0.65, 0.7, 0.75, 0.8, 0.85, 0.9, and 0.95. For example, the range 3 to 4 includes, but is not limited to, 3.05, 3.1, 3.15, 3.2, 3.25, 3.3, 3.35, 3.4, 3.45, 3.5, 3.55, 3.6, 3.65, 3.7, 3.75, 3.8, 3.85, 3.9, and 3.95. Thus, even if specific data points within the range, or even no data points within the range, are explicitly identified or specifically referred to, it is to be understood that any data points within the range are to be considered to have been specified, and that the inventors possessed knowledge of the entire range and the points within the range.

As used herein, the term "substantially" means that the subsequently described event or circumstance completely occurs or that the subsequently described event or circumstance occurs to a great extent or degree. For example, the term "substantially" means that the subsequently described event or circumstance occurs at least 90% of the time, or at least 95% of the time, or at least 98% of the time, or comprises at least 90%, 95%, or 98% of the reference quantity.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein any reference to "we" as a pronoun herein refers generally to laboratory personnel or other contributors who assisted in the laboratory procedures and data collection and is not intended to represent an inventorship role by said laboratory personnel or other contributors in any subject matter disclosed herein.

Turning now to various non-limiting embodiments of the present disclosure, a growing awareness of safety and security has boosted the growth of the wireless camera markets. Generally, wireless cameras process the video/audio streams (e.g., compressing them to a smaller size that facilitates transmission) and then upload them through a WLAN to a cloud backend server. Data transmission from the camera to the base station or router is regulated by wireless protocols. Wireless security cameras are usually equipped with motion or sound sensors for increased security, so that once motion or sound is detected, the camera turns on and starts recording, uploading captured video to the cloud backend server and sending a notification to the property owner. Table 1 lists some technical parameters of popular wireless cameras. Sound-triggered systems often suffer from high false alarms via barking dogs, loud cars or other random noises. In the present disclosure, motion-activated wireless cameras, which have been widely adopted for security surveillance, are addressed.

TABLE 1

Motion sensor equipped wireless cameras.

| Model | Chipset | Alert | Protocol | Hub |
|---|---|---|---|---|
| AIVIO Cam | MediaTek | M* | WiFi | Yes |
| Arlo Essential | Broadcom | M/S** | WiFi/B+ | No |
| Arlo Go | Broadcom | M | 3G/4G-LTE | No |
| Arlo Pro 2 | Broadcom | M/S | WiFi/B | Yes |
| Arlo Pro 3 | Broadcom | M/S | WiFi/B | Yes |
| Arlo Ultra | Broadcom | M/S | WiFi/B | Yes |
| Blink Indoor | MediaTek | M/S | WiFi | No |
| Blink XT2 | TI | M/S | WiFi | Yes |
| Blue by ADT | Broadcom | M | WiFi | No |
| Canary Flex | TI | M | WiFi | No |
| Conico Cam | TI | M | WiFi | No |
| EufyCam 2C | MediaTek | M/S | WiFi | Yes |
| Reolink Argus 2 | MediaTek | M | WiFi | No |
| Reolink Argus Pro | MediaTek | M | WiFi | No |
| Reolink Go | TI | M | 3G/4G-LTE | No |
| Ring Door View | TI | M | WiFi | No |
| Ring Spotlight | TI | M | WiFi | No |
| Ring Stickup Cam | TI | M | WiFi | No |
| SimpliSafe Cam | Telit | M | WiFi | No |
| Swann Wireless | MediaTek | M | WiFi | No |

*M: Motion
**S: Sound
+B: Bluetooth

Motion Sensors

Figure 2A:
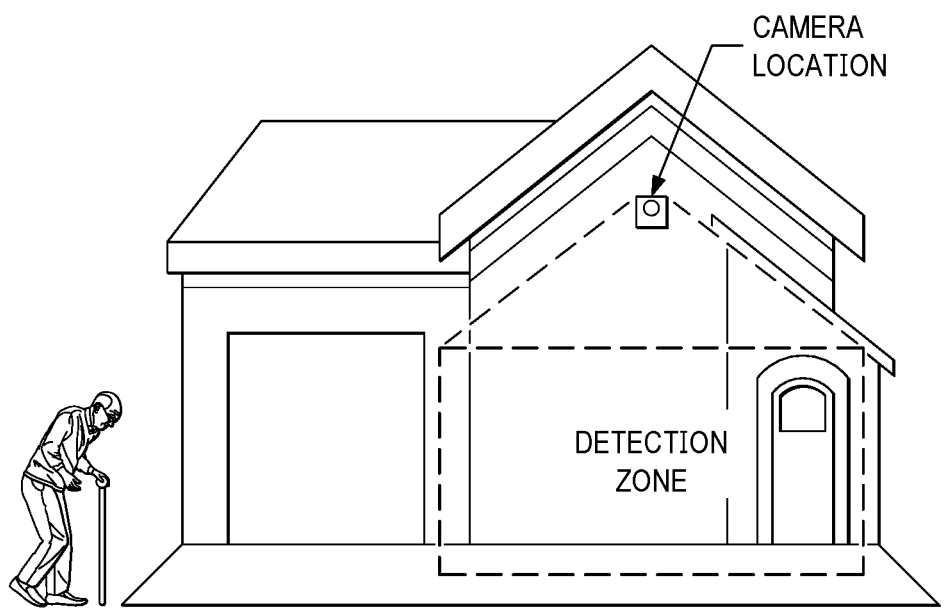
FIG. 2A shows an example of a camera detection zone located outside of a house.
Figure 2B:
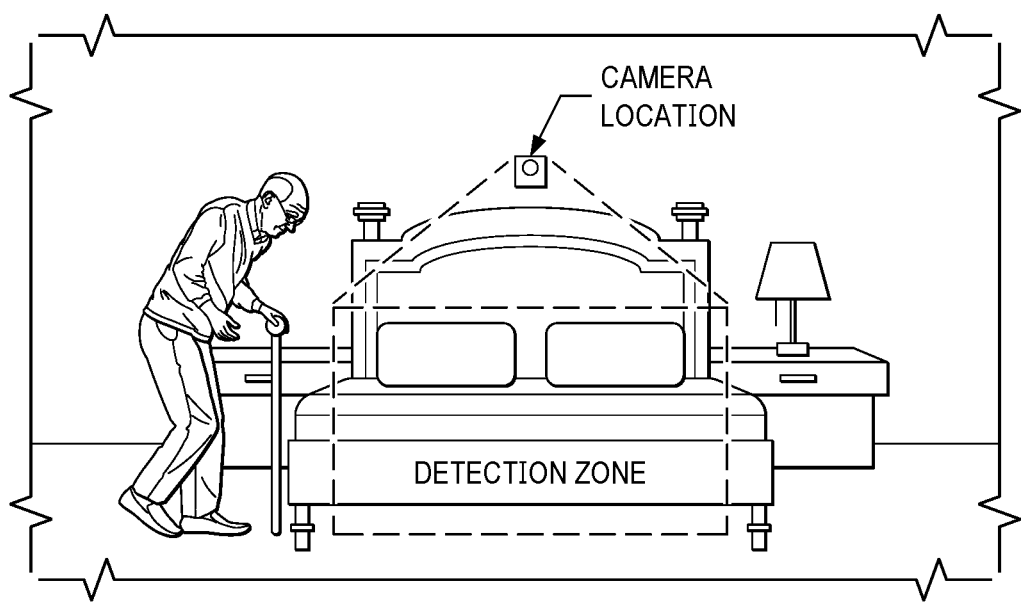
FIG. 2B shows an example of a camera detection zone in a room inside of a house.

Usually, we cannot keep our eyes glued to our security camera's feed on a phone or computer, especially when we have multiple cameras. To get rid of this limitation, a wireless security camera, incorporating a motion sensor, provides a practical solution. FIG. 2A shows an example of a camera detection zone for an outdoor environment, and FIG. 2B shows an example of a camera detection zone for an indoor environment.

There are various types of motion sensors, such as passive infrared (PIR), ultrasonic, microwave, and tomographic. A PIR sensor includes a pyroelectric film material, which is sensitive to radiated heat power fluctuations and converts infrared radiation into electrical signals. This type of sensor can detect the presence of humans or other warm-blooded living beings from the radiation of their body heat. Due to its properties of small size, low cost, power efficiency and being able to work in a dark environment, PIR sensors are widely used in battery-powered wireless cameras. The present disclosure focuses on the localization of wireless cameras equipped with this type of motion sensor. However, it will be understood that the methods of the present disclosure are applicable to wireless cameras equipped with any other type of motion sensor including, but not limited to, microwave, dual technology/hybrid, ultrasonic, area reflective, and vibration motion sensors.

Attack Model and Assumptions

We consider a general scenario, where a user deploys a motion-activated wireless security camera to monitor a target area. The user aims to keep the camera hidden to avoid being noticed. An adversary aims to pinpoint the location of the camera with the MotionCompass technique. MotionCompass can also be utilized to find hidden cameras in untrustworthy hotels, rental units, or Airbnb rooms, in which cases the roles of "attacker" and "legitimate user" are reversed, but for consistency and to prevent confusion, we will use these roles as just introduced.

We assume the adversary has a wireless sniffer capability to "sniff" the wireless traffic (such methodologies are well known in the art), and can also safely perform some motion around the camera without being caught. For example, the adversary can ask a helper to walk or use a moving robot/drone to introduce manipulated movement. We also assume that the adversary can move at a known speed and record the time elapsed so that she can measure the movement distance. This can be achieved for example by using an Android app to log all the accelerometer readings for calculating the speed.

Camera Localization

Overview

Figure 3:
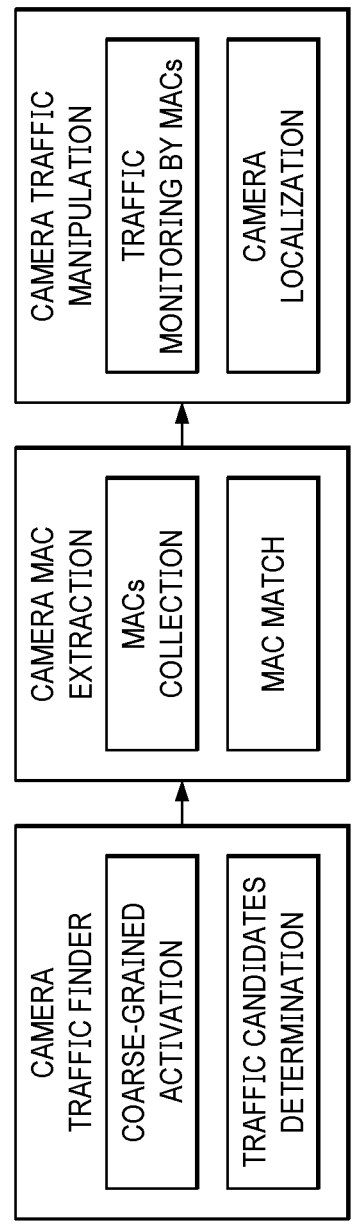
FIG. 3 shows three phases of the localization scheme of the present disclosure.

MotionCompass includes three important phases, i.e., camera traffic finder, camera MAC extraction, and camera traffic manipulation, as shown in FIG. 3.

The first phase determines the wireless traffic associated with wireless cameras. When the user introduces motion activity within an interested area, if there is a camera monitoring this area, the user would observe a wireless traffic pattern that is highly correlated with the movement trajectory. To eliminate the interference of motion-activated non-camera devices (e.g., smart WiFi motion sensor), we utilize the second phase, which first collects all MACs embedded in each traffic flow and then searches the OUI of each MAC in a table consisting of all OUIs assigned to cameras. If a match is found, the MAC would be regarded as belonging to a camera. The extracted MACs would be the input of the third phase, and all traffic flows with them would be monitored. The user then performs motion along specifically designed paths, and pinpoints the camera's location by correlating the manipulated motion paths with the wireless traffic that the monitored wireless camera generates. The details for each phase are shown in the following discussion.

Camera Traffic Finder

Since there are numerous wireless traffic flows in the air, we need to shrink the candidates for wireless camera traffic flow. Motion is generated in the target area to stimulate potential cameras monitoring the area, and then the resultant wireless traffic is utilized to determine candidate traffic flows that may be generated by a wireless security camera.

1. Coarse-Grained Activation

Figure 4:
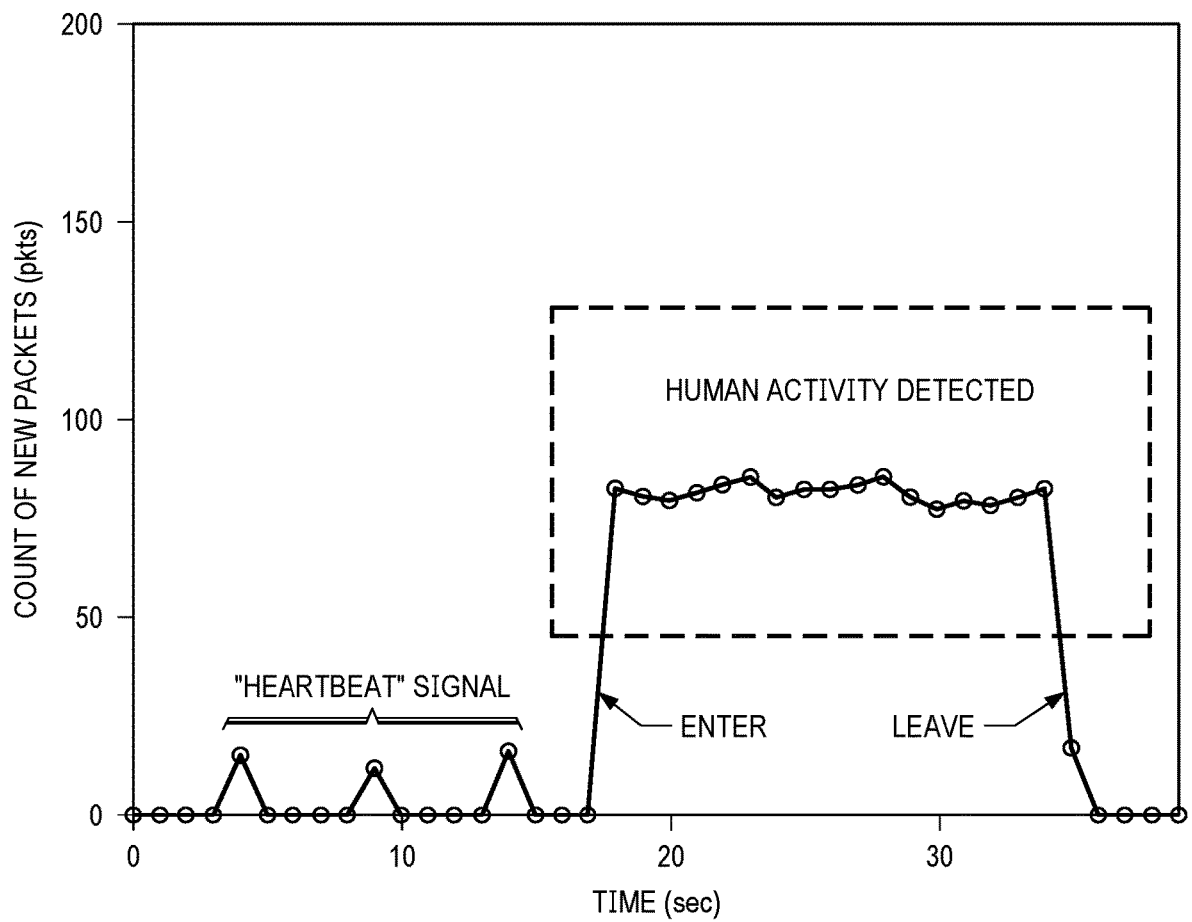
FIG. 4 shows how the count of newly captured packets fluctuates as a user walks past the detection zone of the camera.

Wireless cameras are usually battery powered. They sit in a standby mode to conserve battery power, and begin to record only when they detect motion or sound (i.e., activation signals). These videos are then sent to the cloud backend server for secure storage in owners' libraries. Also, when the video recording is activated, the camera can send the owner push notifications or email alerts. Therefore, in order to observe the wireless traffic of the camera (i.e., enable the camera to send packets), an attacker can manually generate the activation signals in a target area. As a result, when the motion happens to be performed in the motion activity zone, the camera recording will be then triggered. As shown in FIG. 4, when the camera (e.g., Amazon Blink XT2) lies in standby mode, only a "heartbeat" signal of small size is sent out to the camera base station or the router at a regular interval in the order of seconds, indicating normal operation or to synchronize with the other party. If human activity is detected, an abnormally high wireless traffic flow would be generated accordingly.

2 Traffic Candidates Determination

When the camera is in standby mode, the microcontroller unit (MCU) consumes less power and only processes data monitored by the built-in microphone or motion sensor. Once the activation signal is detected, the MCU awakens the complementary metal-oxide-semiconductor (CMOS) sensor to start recording until motion stops, and meanwhile enables the wireless networking module to send out recorded video. As a result, the traffic generated by the wireless camera exhibits a distinguishable pattern, i.e., the volume of camera traffic depends on whether the camera is activated or not.

The specific pattern of camera traffic provides an adversary an opportunity to correlate the intentional activation with the existence of the wireless camera. If a monitored wireless traffic suddenly becomes faster when a motion is performed and slower when the motion stops, this traffic flow can be then determined as a candidate for the camera traffic.

Camera MAC Extraction

Wireless cameras are powered by systems-on-a-chip (SoCs) from a few SoC manufacturers such as Broadcom, Ambarella, and Texas Instruments (TI). SoCs typically bundle processors, memories, and wireless networking capabilities, as well as power management circuits. As a result, the link-layer MAC address of a wireless camera is determined by corresponding SoC manufacturer and has the following format: for any six-byte MAC address, the first half is the OUI, indicating the device manufacturer; and the second half represents the unique device identifier (ID). The MAC address intends to be a permanent and globally unique identification. Thus, the prefix (i.e., OUI) of a wireless camera's MAC address is fixed. The phase of camera MAC extraction aims to extract the MAC address of the target camera. To achieve this goal, we can compare the prefix of each MAC extracted from candidate camera traffic flows with publicly available prefixes (e.g., IEEE, OUI public listing, 2020, http://standards-oui.ieee.org/oui/oui.txt) defined by SoC suppliers to determine whether the monitored traffic belongs to a wireless security camera.

Collection of MAC Identifiers

Figure 5:
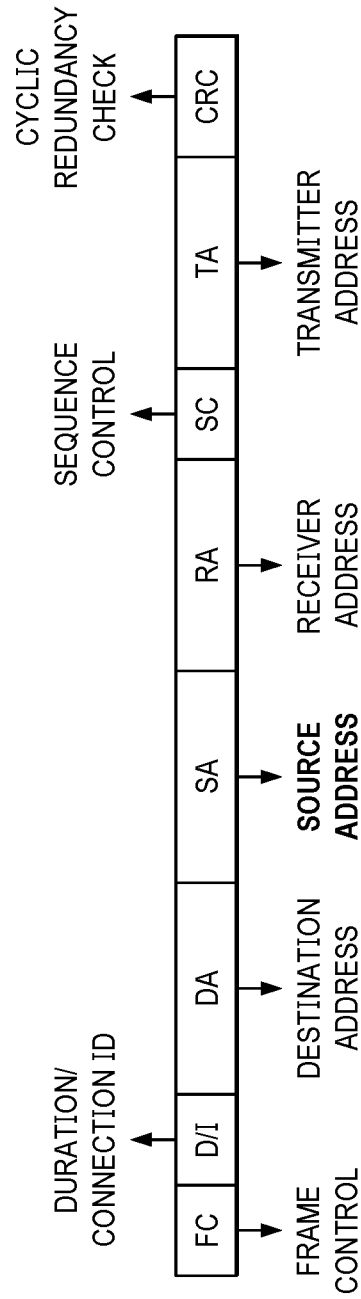
FIG. 5 shows a schematic of a header format of an IEEE 802.11 media access control (MAC) frame.

IEEE 802.11 wireless protocols are utilized in almost all commodity network devices, including wireless cameras. The use of IEEE 802.11, however, may cause exposure of MAC addresses, and a wireless eavesdropper within the radio range of a wireless transmitter can capture the corresponding MAC address. Though the data packets generated by the wireless camera are encrypted, the raw wireless frames are broadcasted over the air and the camera transmits its unencrypted MAC (i.e., source address) in the header of the IEEE 802.11 MAC frame, as shown in FIG. 5.

To capture the raw wireless frames of the camera, the channels that the camera operates on should be known. Wireless sniffing tools (e.g., Airmon-ng toolkit, which is open source) can capture raw 802.11 MAC frames and thus help determine all active channels nearby. The problem then becomes how to sort out the data frames generated by the camera from packets generated by various other devices that pass the first phase.

Camera MAC Match

As noted above, the 3-byte OUI prefix of a MAC is normally fixed and depends on the manufacturer and the type of device. For example, Amazon Blink wireless cameras use HongHai's chipset for WiFi communication, and the OUI of their MACs starts with "1C-BF-CE", where "1C" denotes the HongHai company and "BFCE" indicates the camera department.

The uniqueness of OUI motivates us to first build a library containing OUIs of all cameras on the market, and then utilize it to determine whether the monitored traffic belongs to a wireless camera. We refer to such a table as a camera-labeled OUI table. Specifically, if the OUI of a MAC extracted from a monitored packet can be found in the OUI table, this corresponding traffic is regarded as being generated by a camera.

MAC Spoofing

Though manufacturers assign MAC addresses using the global standard, it may not be the case that devices will actually broadcast the OUI-based MAC that is originally flashed into the devices. Some devices may enable the user to change the MAC arbitrarily in software. Thus, the user may use a non-camera-manufacturer-based OUI for the camera to bypass the camera traffic detection, or use a camera-manufacturer-based OUI for a non-camera device to slow down the localization process. However, recent studies have proposed techniques using a unique identifier called the universally unique identifier-enrollee (UUIDE), which can successfully recover the device's original, global MAC from the spoofed or randomized MAC. Combining with such techniques to recover real MAC (if MAC spoofing occurs), the presently disclosed OUI-based traffic analysis still works. Additionally, another solution can be used to handle MAC spoofing. SoCs provide video encoding and data transfer functionality for wireless cameras. Thus, the traffic patterns of wireless cameras highly depend on the corresponding SoCs. As most SoCs take similar encoding methods (e.g., H.264, H.265, and MJPEG), the resultant traffic patterns are similar as well. This observation motivates us to first train a support vector machine (SVM) model to classify traffic patterns, and then utilize it to determine whether each captured traffic belongs to a wireless camera.

Figure 6:
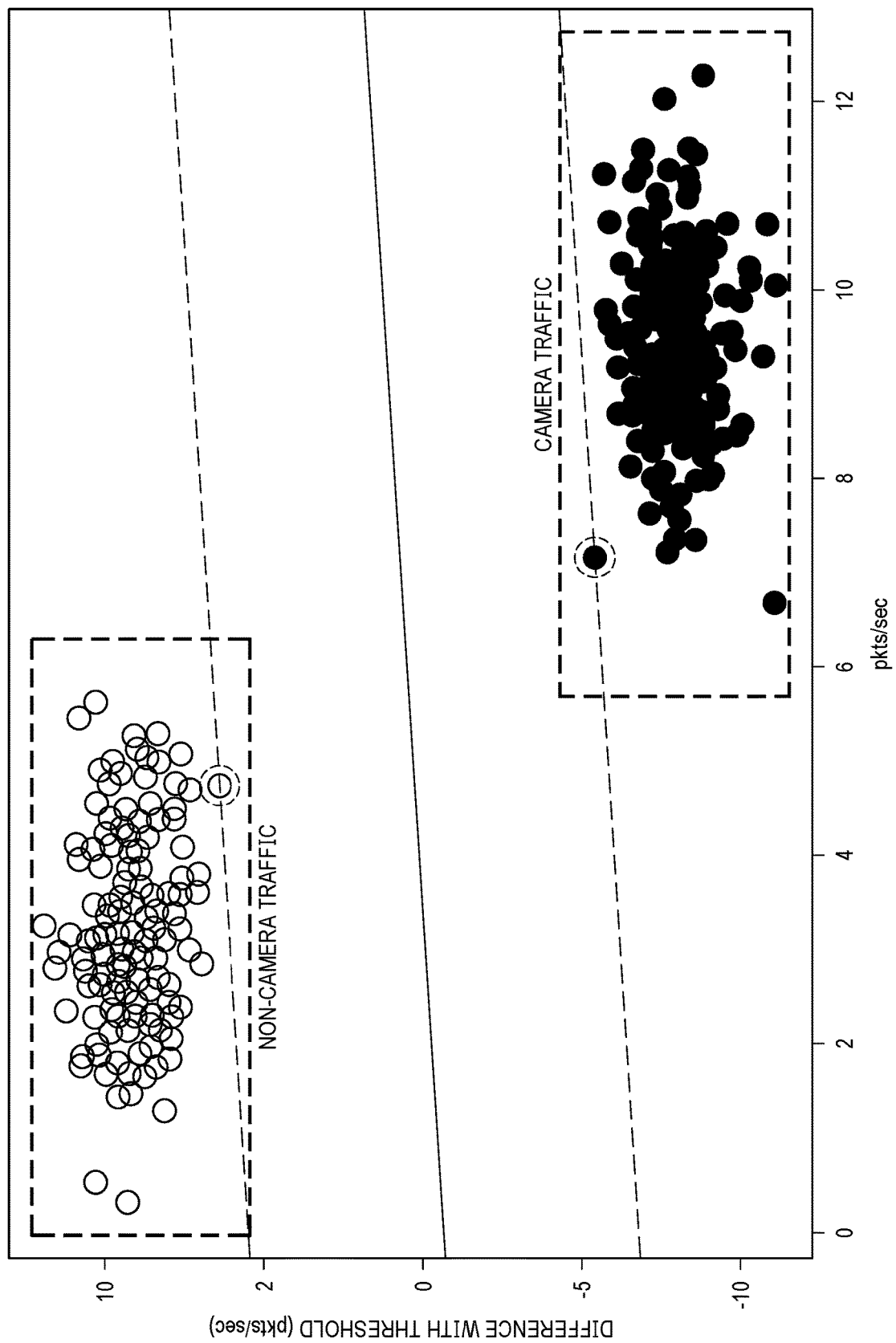
FIG. 6 shows an SVM training result for wireless traffic flows.

The SVM classifier model can be formed, for example, using the Scikit-learn libraries with Python 3.8.1. A threshold is set, based on the average value of data transmission rates of various wireless devices in the environment. For each traffic flow, its data transmission rate is extracted along with the difference between this rate and the threshold. FIG. 6 shows the result of running SVM on 400 traffic flows coming from both wireless cameras and non-camera devices, demonstrating the success of distinguishing traffic flows generated by wireless cameras Camera Traffic Manipulation Camera traffic manipulation aims to shrink the possible candidates of the target camera determined in the previous phase into one and also pinpoint its exact location. First, a listener is set up to monitor the traffic transmitted from all candidate cameras and then observe the traffic change of each channel when the system is provoked by manipulated environmental motion. A model is then built to correlate the camera location with the motion pattern, which directly affects the traffic generated by the camera Network Traffic Monitoring by MACs By setting up a packet monitor with existing tools, traffic coming from candidate cameras can be monitored. Specifically, if the traffic volume is detected to have changed, the change of packet count is recorded. If human activity is purposely introduced in a selected area, where a motion-activated camera happens to monitor, the camera will become awakened and generate traffic volume corresponding to the time that the manipulated activity lasts. On the other hand, if the monitored traffic has no change, we can determine that the candidate camera is not monitoring the area where the activity is performed. Motivated by this observation, a customized algorithm is developed to shrink the possible camera candidates and localize the target camera by feeding manipulated stimuli to the motion sensor and observing resultant traffic volume variation.

Camera Localization

Empirically, the longer the duration of motion, the more (cumulative) packets the camera generates. An Amazon Blink XT2 camera and Arlo Pro 2 camera were installed on the wall with a downward angle and monitored the activity in the detection area, respectively. For each scenario, the traffic generated by the camera was monitored and the corresponding amount of the transmitted packets was recorded when a user passed nearby within different durations (i.e., manually producing activity within the coverage range of the motion sensor).

Figure 7:
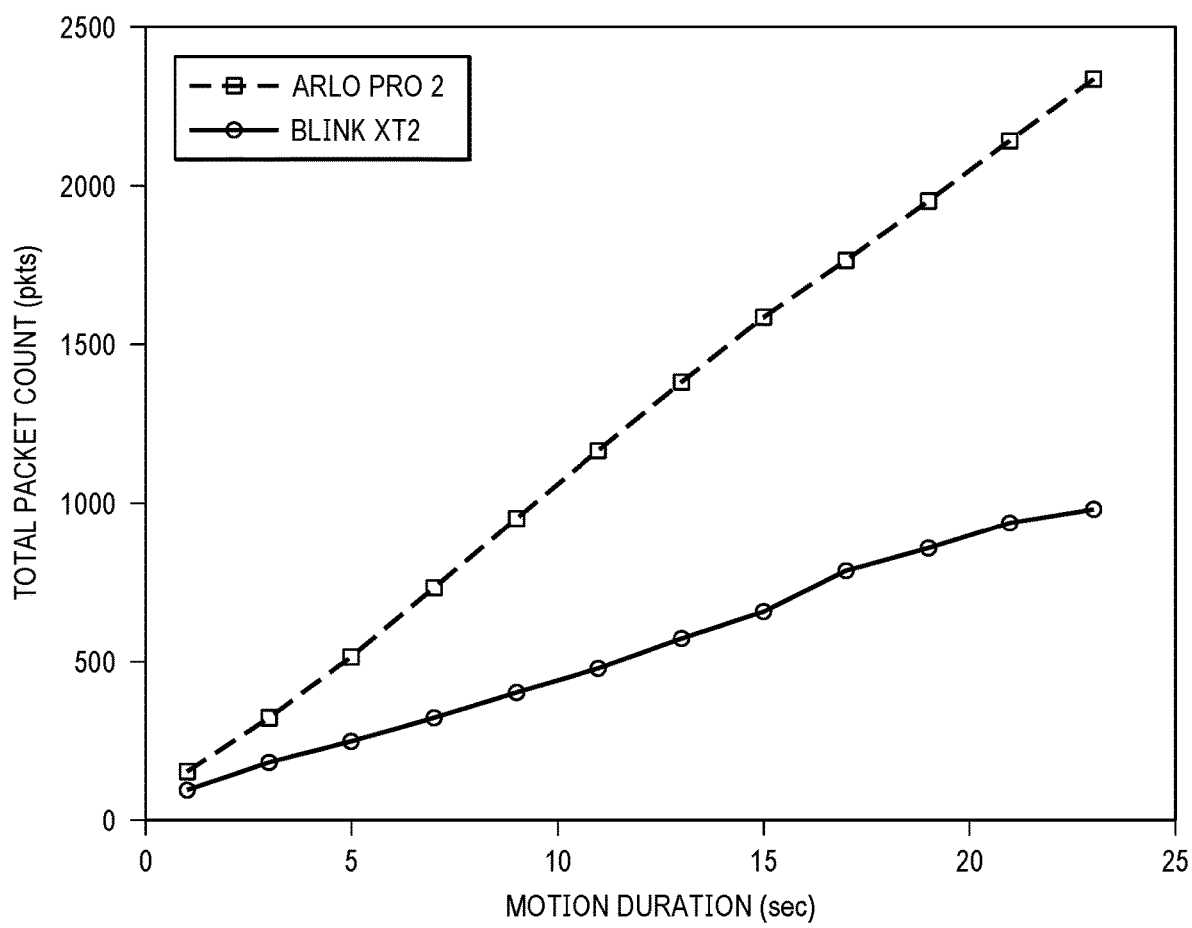
FIG. 7 shows the total packet count vs. motion duration for two types of cameras.

FIG. 7 presents the variation of total packet count with the motion duration for the two different cameras. The obtained packet count shows a nearly linear correlation with the motion duration. For example, when the human activity within the detection zone lasts for 1 second (s), the packet counts for Blink XT2 camera and Arlo Pro 2 camera are 100 and 155 respectively, and also for every 2 s, the corresponding packet counts for the two cameras increase by an average of 80 and 197 (i.e., network throughput maintains almost constant).

Camera Activation Detection

The discovered correlation between exposure time (the duration when the camera is activated) and total packet count can be then explored to determine whether the camera is activated by a user when the user is able to sniff wireless traffic and obtain the total packet count. Specifically, in the present disclosure, we considered a linear function approximation architecture where the count N of network packets generated by a wireless camera is approximated as $$N = a + R \cdot \Delta t, \quad (\text{Eq. 1})$$

where a is a constant, R represents the throughput (i.e., the rate at which the activated camera generates packets), and $\Delta t$ denotes exposure time.

With the linear model, we could determine whether the user performing the specified motion was still in the detection range of the motion sensor. Specifically, if the observed total packet count did not fit the linear model with a significant deviation, the performed motion at this time would be determined as out of the detection range of the motion sensor.

Typically, the field of view of a PIR sensor is at 105° or 110° horizontally and 80° vertically. If more PIR sensors are utilized simultaneously, the corresponding detection range can be wider. For example, Arlo Ultra camera has dual PIR sensors and has a horizontal angle of view of 150°. We considered a camera deployed on a vertical wall (which aligns with most practical scenarios). Note for other cases, we can regard that the camera was deployed on a virtual wall (i.e., a plane perpendicular to the floor). Thus, the camera localization problem can be converted to computing the coordinates of the camera, when the bottom left corner of the wall is regarded as the origin.

Coordinates Calculation: Special Case

In order to obtain the maximum horizontal breadth, the camera body is often mounted perpendicular to the wall. Also, in the general case, the camera can be swiveled in any direction, and it can be mounted at any angle to the wall as long as its view is not obstructed by the wall. We first address the special case when the camera is mounted perpendicular to the wall.

Figure 8A:
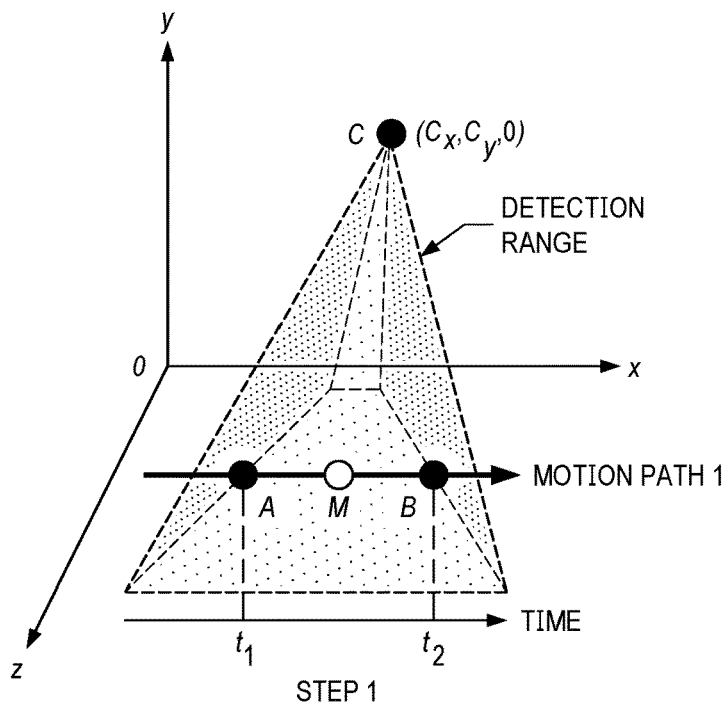
FIG. 8A shows a first step of an example of a two-step procedure of the present localization scheme.
Figure 8B:
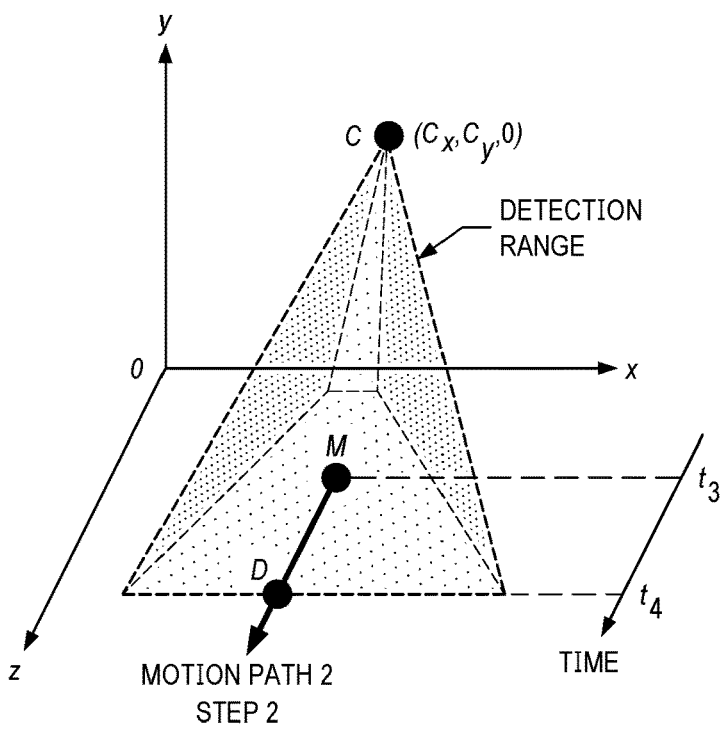
FIG. 8B shows a second step of the example of the two-step procedure of the present localization scheme.

A two-step procedure is used to pinpoint the camera. As shown in FIGS. 8A and 8B, a user can perform motion along two paths with an average speed of $\upsilon$ and simultaneously monitor the wireless traffic, including, (1) Moving parallel to the wall from left to right (or in the opposite way), as shown in FIG. 8A: when the traffic indicates that the user enters and leaves the detection range, the respective locations are marked as A. The user also tracks the corresponding time $t_1$ and $t_2$ for calculating the walking distance s within the detection range, i.e., $s = |AB| = v \cdot (t_2 - t_1)$.

(2) Vertically getting out of the detection range with the start location at the midpoint M of the line segment $\overline{AB}$, as shown in FIG. 8B. When it is determined that the user leaves the detection range, the location is marked as D. Similarly, the start time and the time the user leaves the detection range are recorded as $t_3$ and $t_4$, and the new walking distance s' within the detection range can be computed as $s' = |MD| = v \cdot (t_4 - t_3)$.

Figure 9:
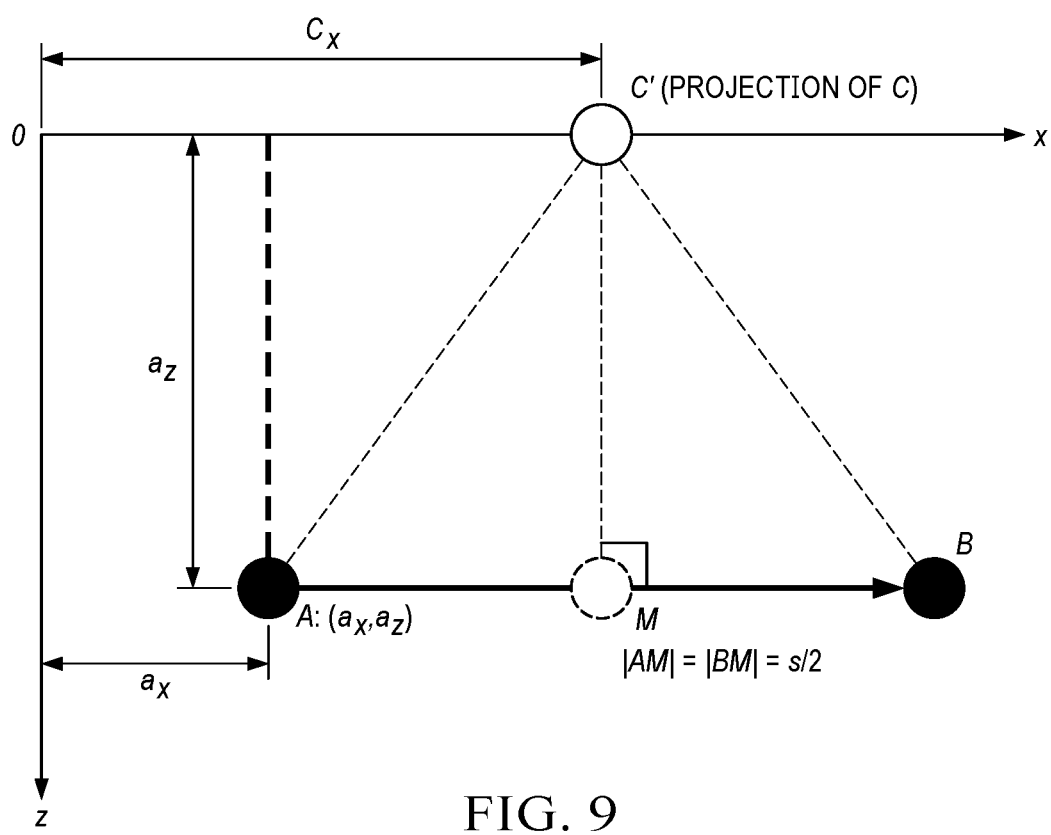
FIG. 9 shows a calculation of cx for the example of FIG. 8.

With step 1, we can obtain the x-axis coordinate $c_x$ of the camera location (i.e., point C). For better understanding the calculation process, we plot the motion path 1 in the xz-plane, as shown in FIG. 9, where C' denotes the projection of the camera location onto the x-axis. Assume that the horizontal distance between location A and the z-axis is $a_x$, and the distance between location A and the wall is $a_z$. Both $a_x$ and $a_z$ can be easily measured by the user. Thus, we can calculate the camera's x-coordinate as $$c_x = a_x + s/2. \tag{Eq. 2}$$

Figure 10:
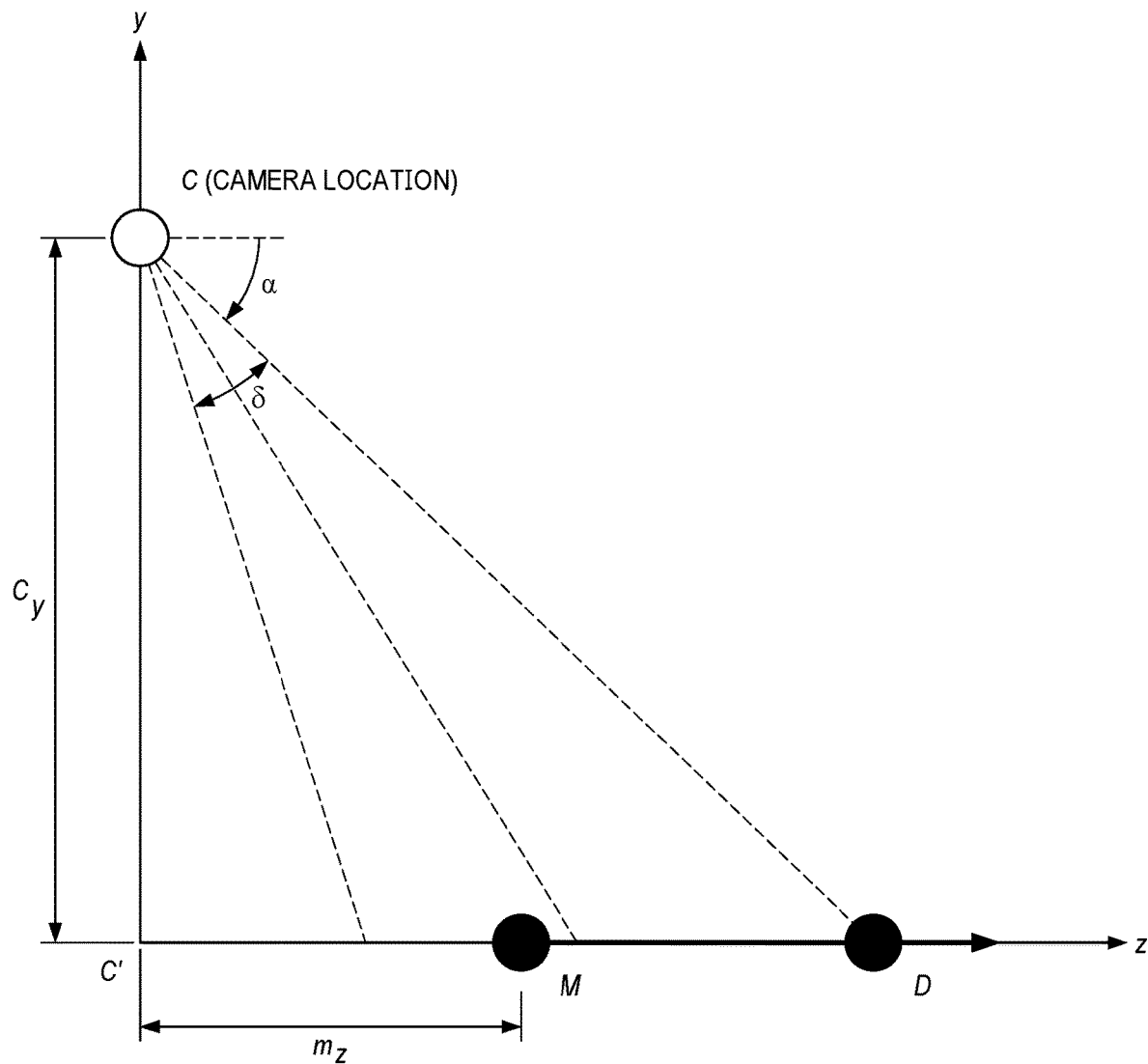
FIG. 10 shows a calculation of cy for the example of FIG. 8.

With only motion path 1, we cannot determine the height $c_y$ of the camera location. Thus, we perform motion path 2 beginning with M towards the outer edge of the detection range (i.e., the line MD is perpendicular to the x-axis). To demonstrate how to calculate $c_y$, similarly, we plot the plane through the points C, M, and D, as shown in FIG. 10.

A general rule of thumb is to install the security camera at a downward angle for better monitoring the target area. Let $\alpha$ denote the camera installation angle, which is the angle between the camera optical axis (i.e., the direction that the camera faces) and the ground. Also, we use $\delta$ to represent the vertical angle of the camera. The camera optical axis divides $\delta$ into two equal angles. With step 1, we can calculate the z-coordinate $m_z$ of point m, which is equal to $a_z$. Meanwhile, we utilize $\gamma$ to denote angle $\angle DCC'$. We thus have $$\begin{cases} \gamma = \left(\frac{\pi}{2} - \alpha\right) + \frac{\delta}{2} \\ \tan\gamma = \frac{m_z + s\prime}{c_y} \end{cases} \tag{Eq. 3}$$

We can then compute the camera's y-coordinate as $$c_y = \frac{a_z + s\prime}{\tan[(\pi - 2\alpha + \delta)/2]}. \tag{Eq. 4}$$

Coordinates Calculation: General Case

As noted above, the camera is not always mounted perpendicular to the wall. The camera body may be pivoted to the left or right. As a result, with the above two-step procedure, the camera may not have the same x-axis coordinate with the midpoint M of motion path 1. This is because the line MC' (C' is the projection of the camera location C onto the x-axis) is not necessarily perpendicular to the x-axis.

Figure 11A:
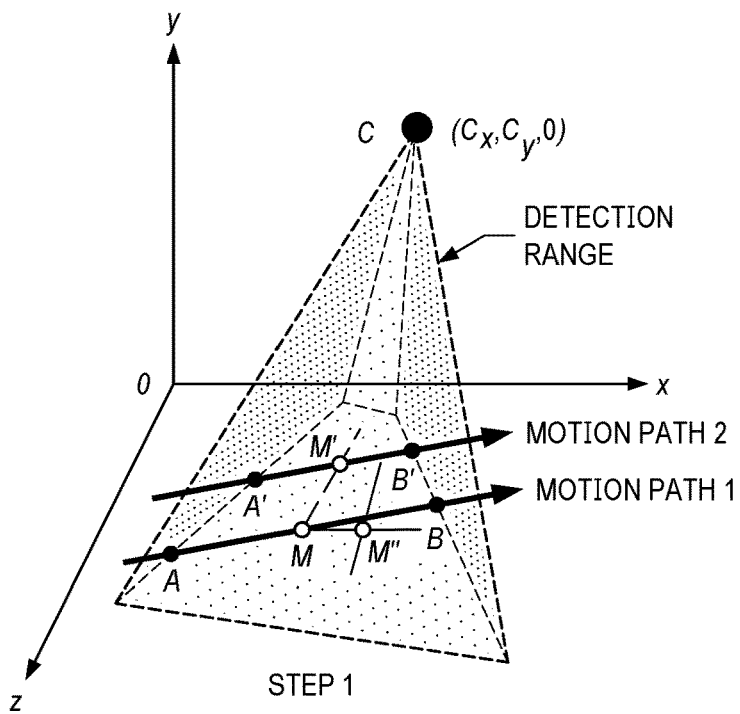
FIG. 11A shows step 1 of an example of an improved two-step procedure of the present localization scheme.
Figure 11B:
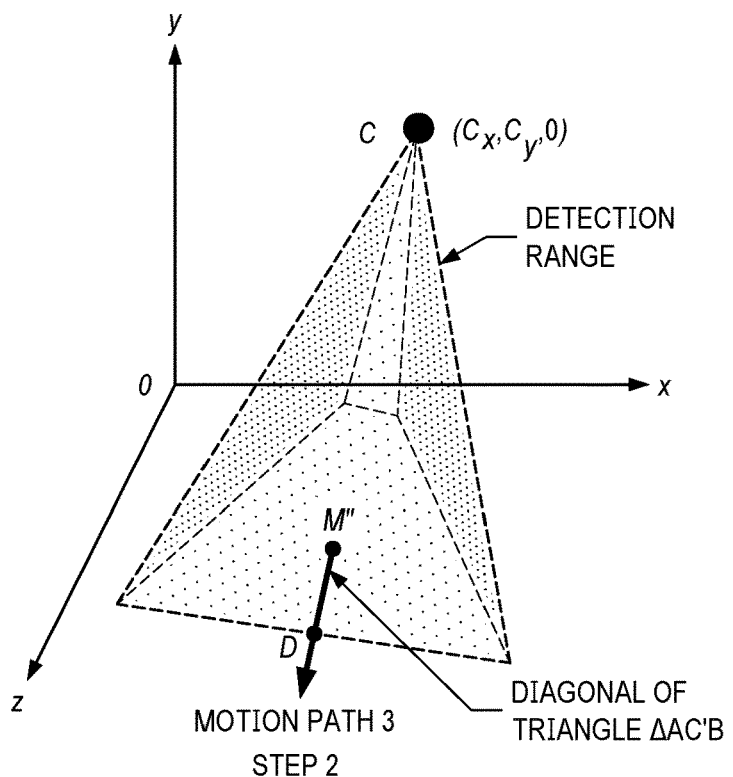
FIG. 11B shows step 2 of the example of the improved two-step procedure of the present localization scheme.

An improved two-step procedure can be used for determining the coordinates of the camera. Specifically, 1. As shown in FIG. 11A, the user moves from left to right (or vice versa) twice and generates two parallel motion paths. Similarly, the user records the locations when she enters and leaves the detection range for each motion path. Four points A, B, C', and B' are obtained, and the midpoints of the line segments $\overline{AB}$ and $\overline{A'B'}$ are denoted with M and M'. The walking distance |AB| is denoted as s. The user then draws a line through M and M', and it intersects the x-axis at the point C' (i.e., the projection of point C onto the x-axis). With the points A, B and C', the user can measure angle $\angle AC'B$ and find its angle bisector. The user can draw another line parallel to the x-axis and through point M, and it will intersect the above angle bisector at a point, denoted with M".
2. As shown in FIG. 11B, the user then gets out of the detection range with the start location at point M" along the angle bisector (i.e., line C'M") of angle $\angle AC'B$. When it is determined that the user leaves the detection range, the location is marked as D. The start time and the time the user leaves the detection range are recorded as $t_5$ and $t_6$. The walking distance s' in this step can be measured as $s' = |M"D| = v \cdot (t_6 - t_5)$.

Figure 12:
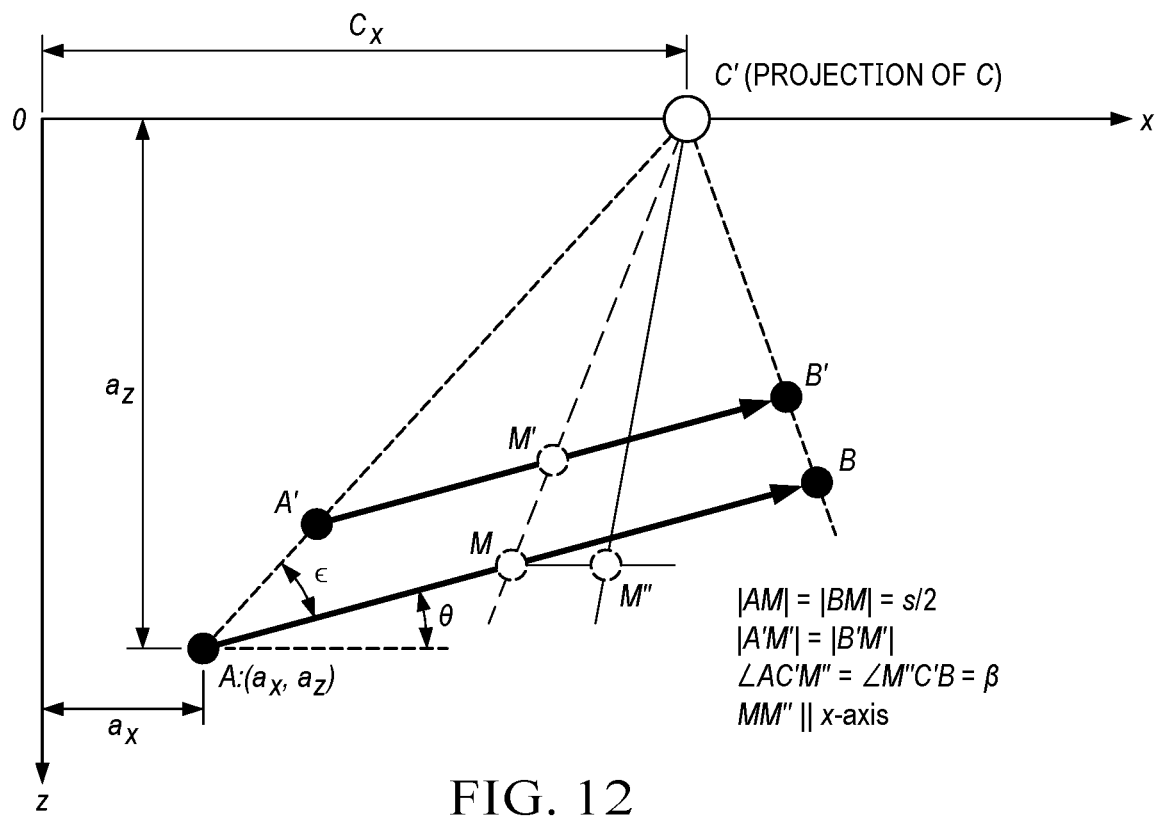
FIG. 12 shows a calculation of cx for the example of FIG. 11A and FIG. 11B.

With the first step, we can calculate the x-axis coordinate $c_x$ of the camera. As shown in FIG. 12, the user can measure the angle $\theta$ between the first or second motion path and the x-axis and the angle $\epsilon$ between C'A and AB. Thus, we have tan $$(\epsilon + \theta) = \frac{a_z}{c_x - a_x}$$

and obtain $$c_x = a_x + \frac{a_z}{\tan(\epsilon + \theta)}. \tag{Eq. 5}$$

Meanwhile, we can calculate the z-coordinate $m_z$ of point M as $$m_z = a_z - \frac{s}{2} \cdot \sin\theta.$$

As the line MM" is parallel to the x-axis, the z-coordinate $m"_z$ of point m" is equal to $m_z$. Let $$\beta = \frac{\angle AC'B}{2},$$

and we then have $\angle OC'M" = \angle OC'A + \angle AC'M" = \epsilon + \theta + \beta$. As a result, we obtain $$|C'M"| = \frac{m_z}{\sin(\epsilon + \theta + \beta)}.$$

The calculation process of the camera's y-axis coordinate $c_y$ is similar to that in the special case. $\triangle CC'D$ is a right triangle where angle $\angle CC'D$ is the right angle, and the angle $\angle DCC'$ (i.e., $\gamma$) is the same for both cases, i.e., $$\gamma = \left(\frac{\pi}{2} - \alpha\right) + \frac{\delta}{2}.$$

We then have tan $$\gamma = \frac{|C'M"| + |M"D|}{|C'C|},$$

and thus obtain $$c_y = \frac{(2a_z - s \cdot \sin\theta)/(2 \cdot \sin(\epsilon + \theta + \beta)) + s\prime}{\tan[(\pi - 2\alpha + \delta)/2]}. \tag{Eq. 6}$$

EXPERIMENTAL EVALUATION

Figure 13:
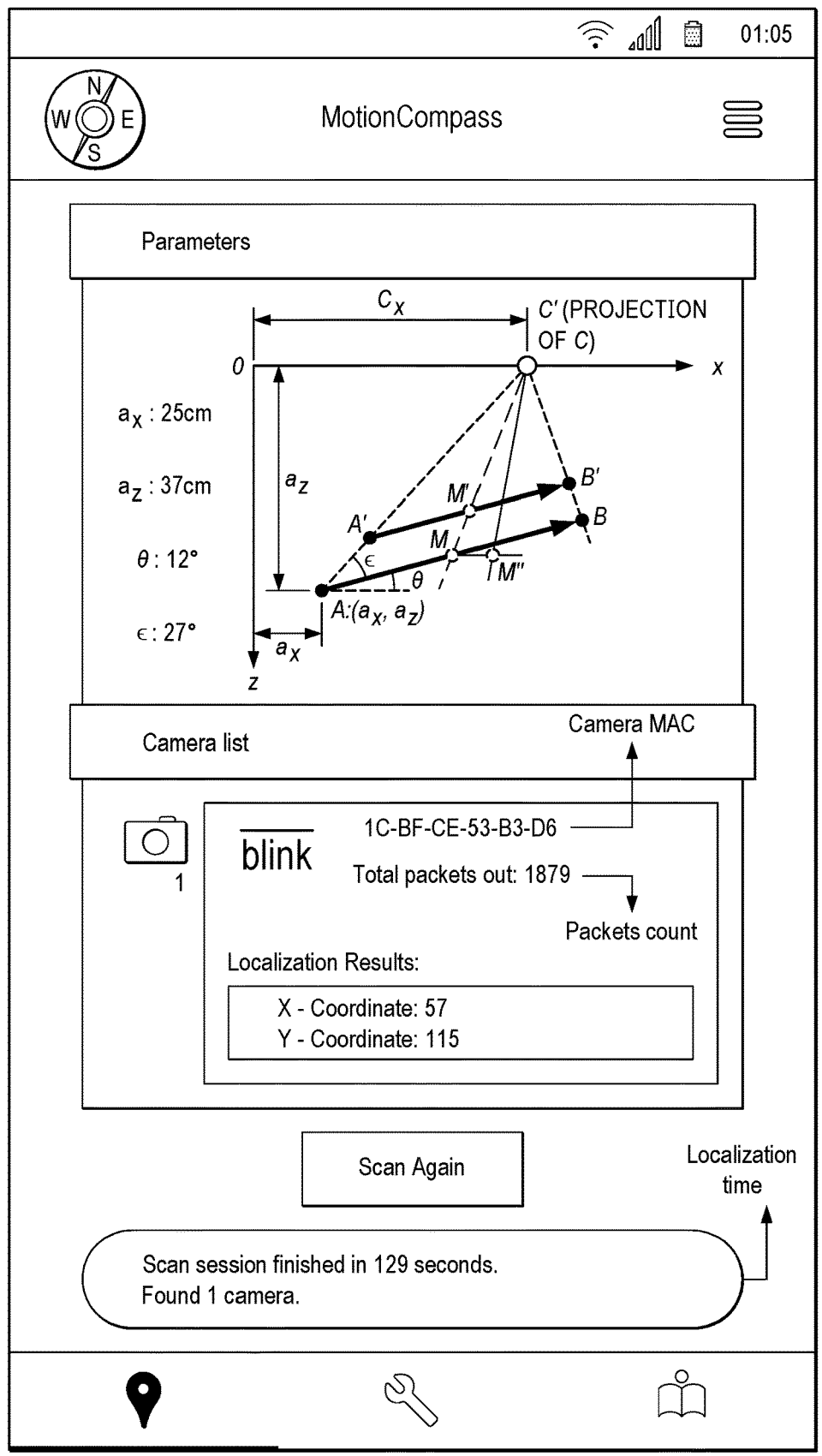
FIG. 13 shows a screen capture of a user interface of the MotionCompass system results after a camera on a wall is localized.

The MotionCompass system is implemented in this non-limiting embodiment on the Android platform. FIG. 13 shows the designed user interface (UI). The default mode for a smartphone's network interface card (NIC) is managed mode, in which it only listens to the traffic that comes for it and discards any packets not destined for it. While MotionCompass needs to listen to all the wireless traffic nearby, the NIC needs to be in monitor mode. The monitor mode function is achieved based on Airmon-ng tools and the Android device running the Kali NetHunter, which is a popular open-source Android ready-only memory (ROM) penetration testing platform.

Evaluation Setup

The adversary first scans the possible MACs for wireless cameras and then performs manual motion to stimulate the camera. By measuring the distances of performed motion paths, as well as the initial parameters, such as the coordinates $(a_x, a_z)$ of the start point within the camera detection range when the attacker introduces motion along the first motion path, and the angle between the first motion path and the wall, the adversary can then calculate the exact location of the camera.

Testing Cameras

Eighteen popular wireless cameras, as shown in Table 2, were tested. Those cameras can be divided into two groups; G1 consisting of cameras (ID 1-15) with one motion sensor, and G2 including cameras (ID 16-18) with two motion sensors.

TABLE 2

Wireless security cameras tested

| Camera ID | Model | Amount of PIR Sensors |
| --- | --- | --- |
| 1 | AIVIO Cam | 1 |
| 2 | Arlo Essential | 1 |
| 3 | Arlo Pro 2 | 1 |
| 4 | Arlo Pro 3 | 1 |
| 5 | Blink Indoor | 1 |
| 6 | Blink XT2 | 1 |
| 7 | Blue by ADT | 1 |
| 8 | Canary Flex | 1 |
| 9 | Conico Cam | 1 |
| 10 | EufyCam 2C | 1 |
| 11 | Reolink Argus 2 | 1 |
| 12 | Reolink Argus Pro | 1 |
| 13 | Ring Door View | 1 |
| 14 | SimpliSafe Cam | 1 |
| 15 | Swann Wireless | 1 |
| 16 | Arlo Ultra | 2 |
| 17 | Ring Spotlight | 2 |
| 18 | Ring Stickup Cam | 2 |

Testing Scenarios

In an outdoor scenario, we conducted the experiment outside of a typical American single-family house. The camera was installed at five different locations with different fields of view on the front outside wall (with a width of 10 meters (m) and a height of 5.5 m), schematically shown in FIG. 14A. In an indoor scenario, we selected a bedroom to perform the experiment. We also placed the camera at five different locations: two in the top-left and top-right corners of an inside wall (with a width of 5.5 m and a height of 2 m), one on top of the headboard, and two placed on the nightstands beside the bed, schematically shown in FIG. 14B. The camera could be mounted at different angles along the wall. We did not consider the cases when most areas in the camera's field of view were obstructed by the wall, as recording capability of the camera is highly restricted under these circumstances.

Metrics

Two metrics were used, localization error and localization time. Localization error is measured as the Euclidean distance between the camera's estimated position and its corresponding true location. Localization time is the amount of time spent on obtaining the exact location of the camera.

Case Study

Figure 14A:
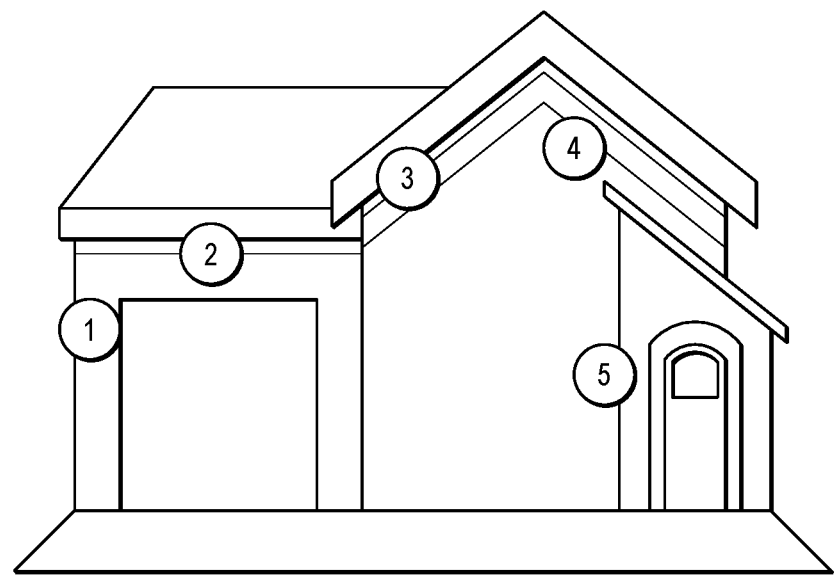
FIG. 14A shows an example of an experimental environmental layout set up on the exterior of a house.
Figure 14B:
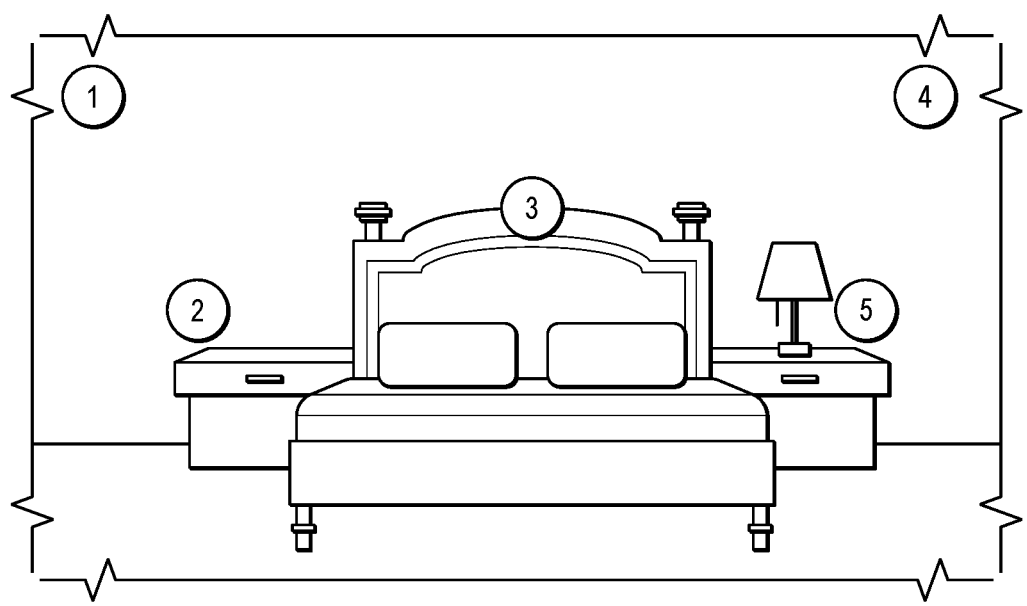
FIG. 14B shows an example of an experimental environmental layout set up in the interior of a room of a house.

In this example, a Blink XT2 camera was installed at Location 2 of the house, as shown in FIG. 14A. MotionCompass was then launched 10 times. We manually rotated the camera horizontally or vertically to make the camera aim at different areas each time.

Figure 15:
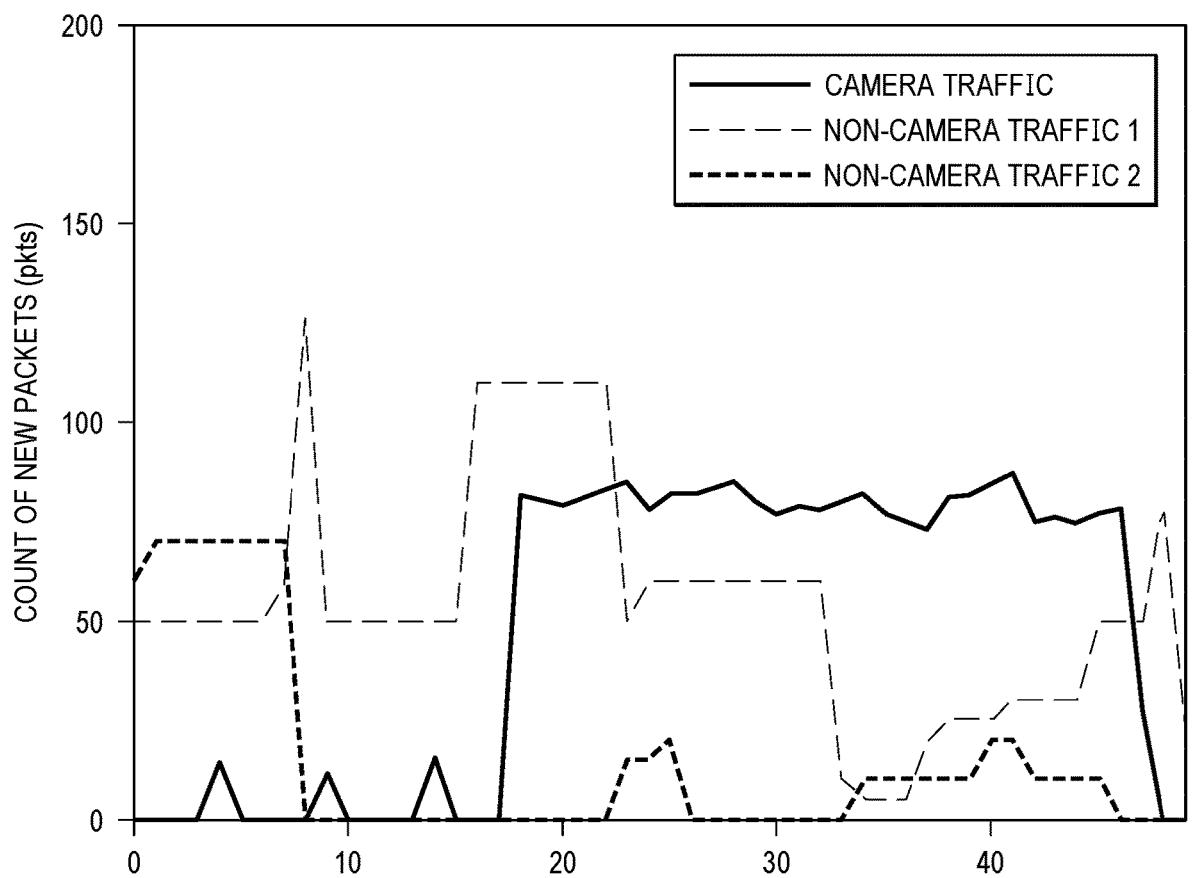
FIG. 15 shows the sources and configurations of wireless traffic.

During an example test, the user determined the existence of a wireless camera monitoring the target area (i.e., the driveway of the house). FIG. 15 shows the traffic flow generated by different devices. The user initiated the continuous movement in the target area. We observed a strong correlation between the camera traffic throughput and the motion. The count of newly generated packets matched with the newly performed motion. However, non-camera traffic flows did not have an obvious relationship with the motion. By comparing MAC addresses, we further found the non-camera traffic flows 1 and 2 belonged to an iPhone in use and an Android device in standby mode, respectively. For all 10 tests, the camera traffic was identified successfully.

Figure 16:
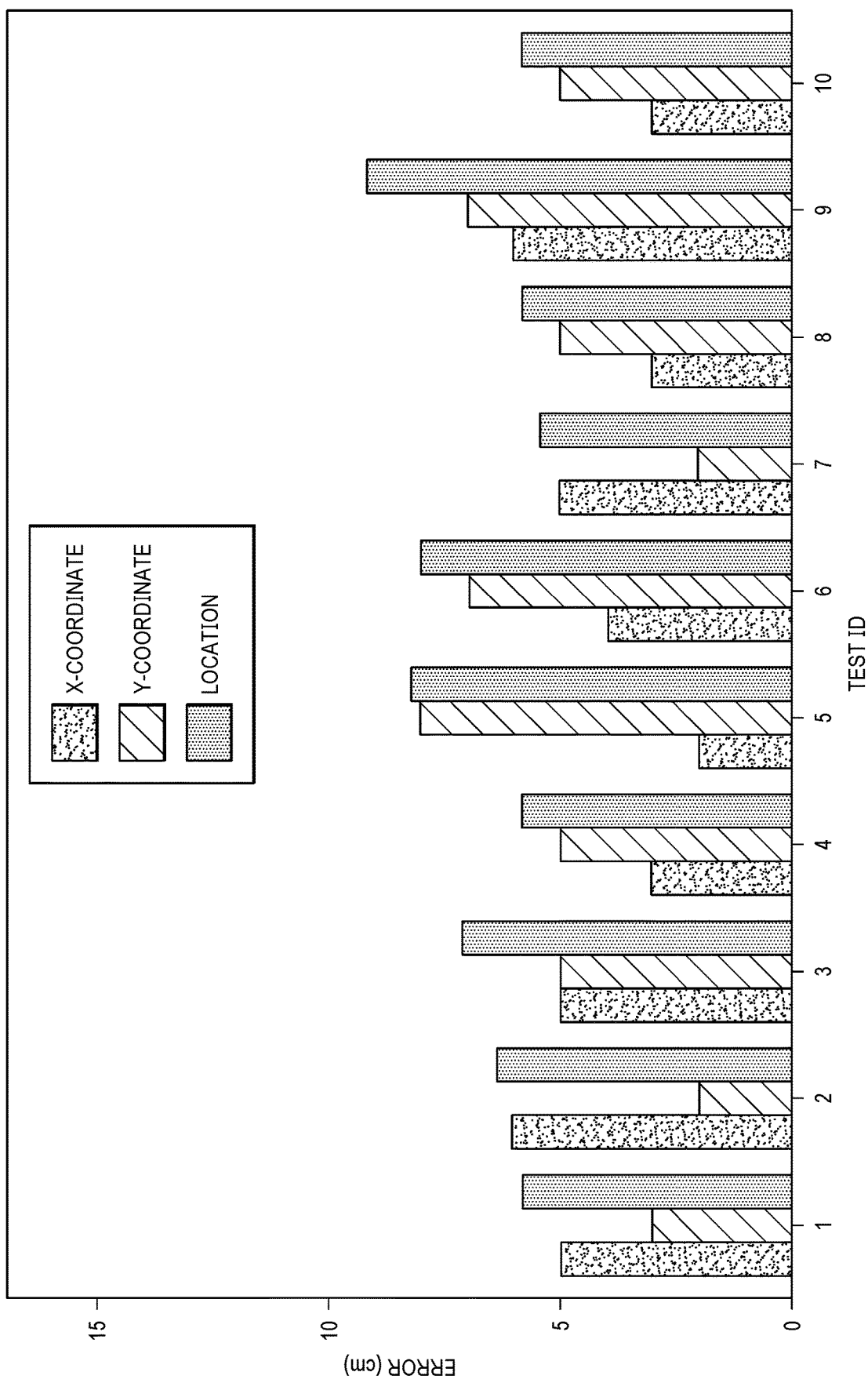
FIG. 16 shows the results of localization accuracy obtained from several tests.
Figure 17:
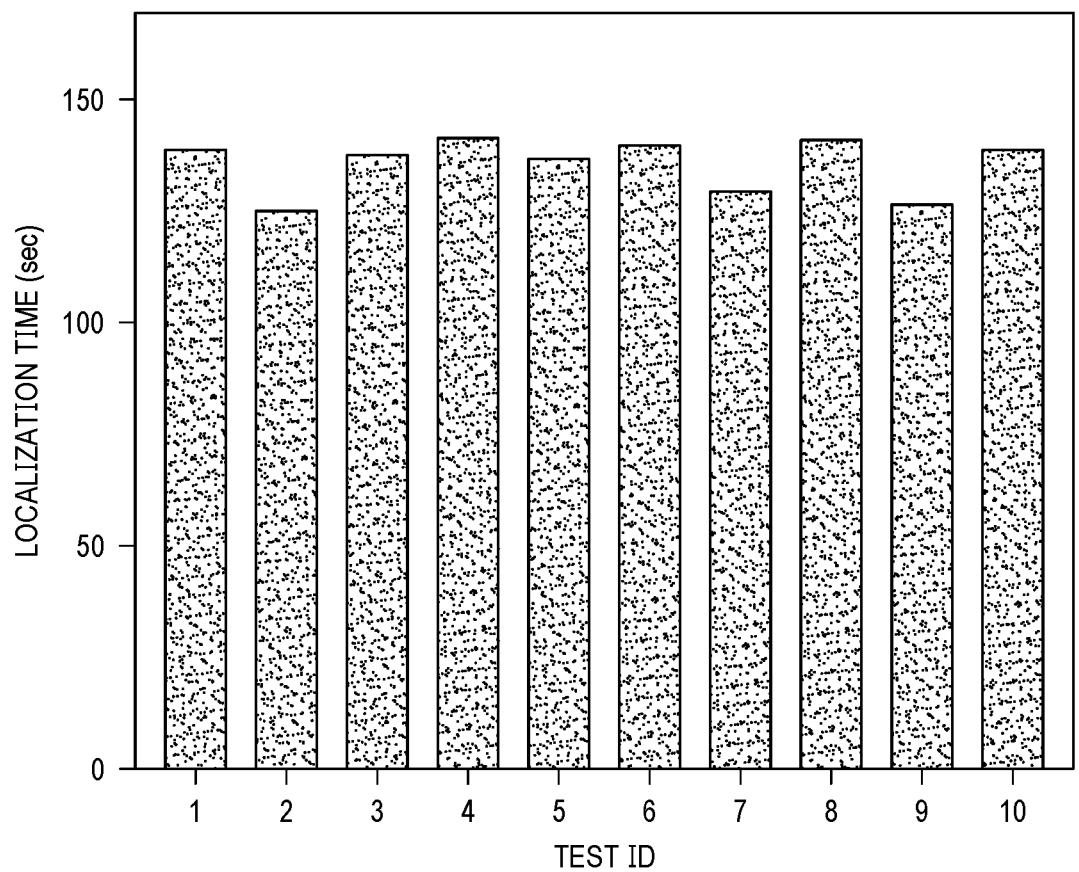
FIG. 17 shows the results of localization time obtained from several tests.

We compared the estimated x- and y-coordinate of the camera with their respective true values, and also calculated the localization error. FIG. 16 shows the localization error along with errors in the x- and y-coordinate. We observed that the localization error was consistently below 9.2 centimeters (cm). In most tests, the error in x-coordinate was slightly smaller than that in y-coordinate. Also, the average errors in the two coordinates are 4.2 cm and 4.9 cm, respectively. These results show that MotionCompass can achieve a high accuracy. FIG. 17 shows the localization time for each test. The camera was localized within a range of 125 to 142 s, demonstrating the efficiency of MotionCompass.

Impact of Camera's Initial Angle

The camera may have a non-right angle along the wall in the xz-plane (i.e., ground). We refer to such an angle between the wall and the camera as the initial angle, denoted with $\psi$. The motion sensor of the Blink XT2 camera has an about 105° horizontal angle of view. The initial angle can be thus adjusted from 52.5° to 90°; otherwise, the field of view would be obstructed by the wall. We vary $\psi$ from 90° to 55°, with decrements of 5°. For each $\psi$, we performed 10 attempts to localize the camera.

Figure 18:
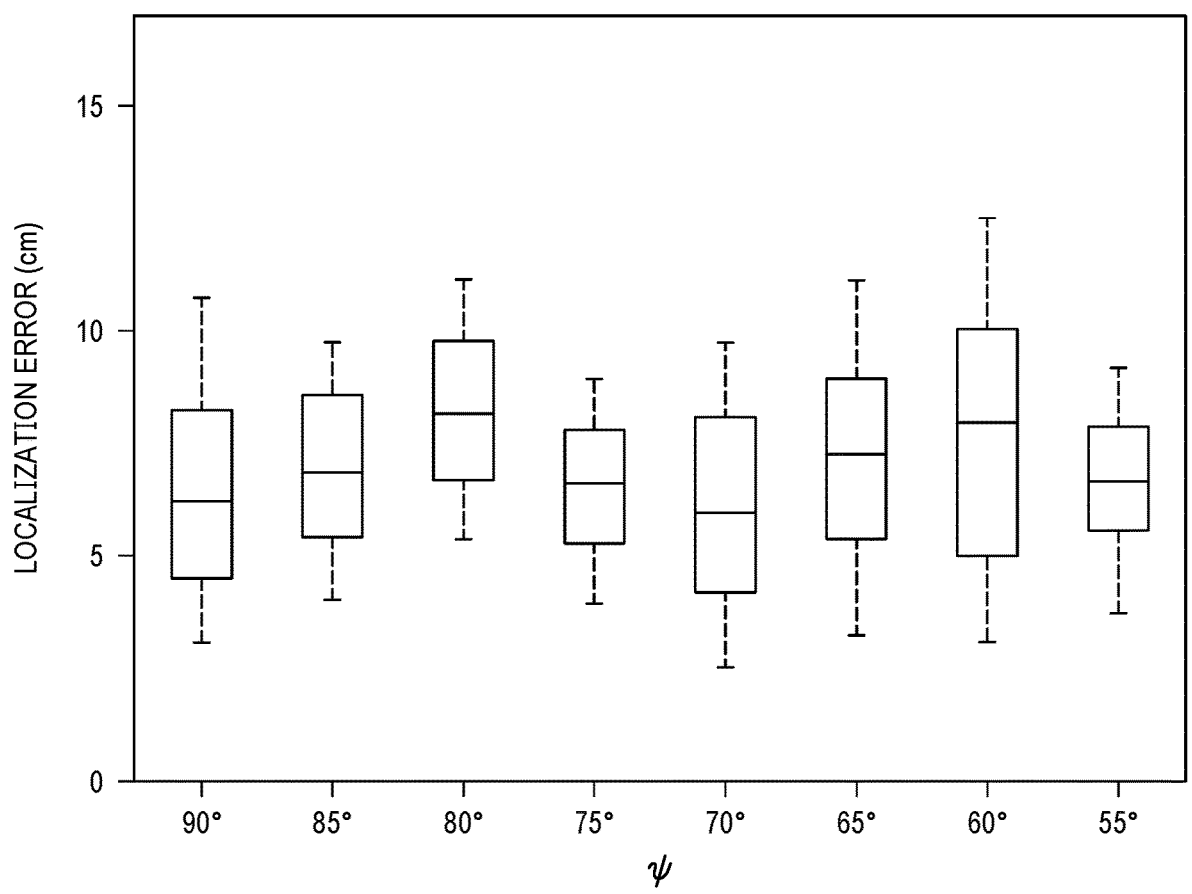
FIG. 18 shows the results of localization error obtained from several different initial angles ($\psi$).
Figure 19:
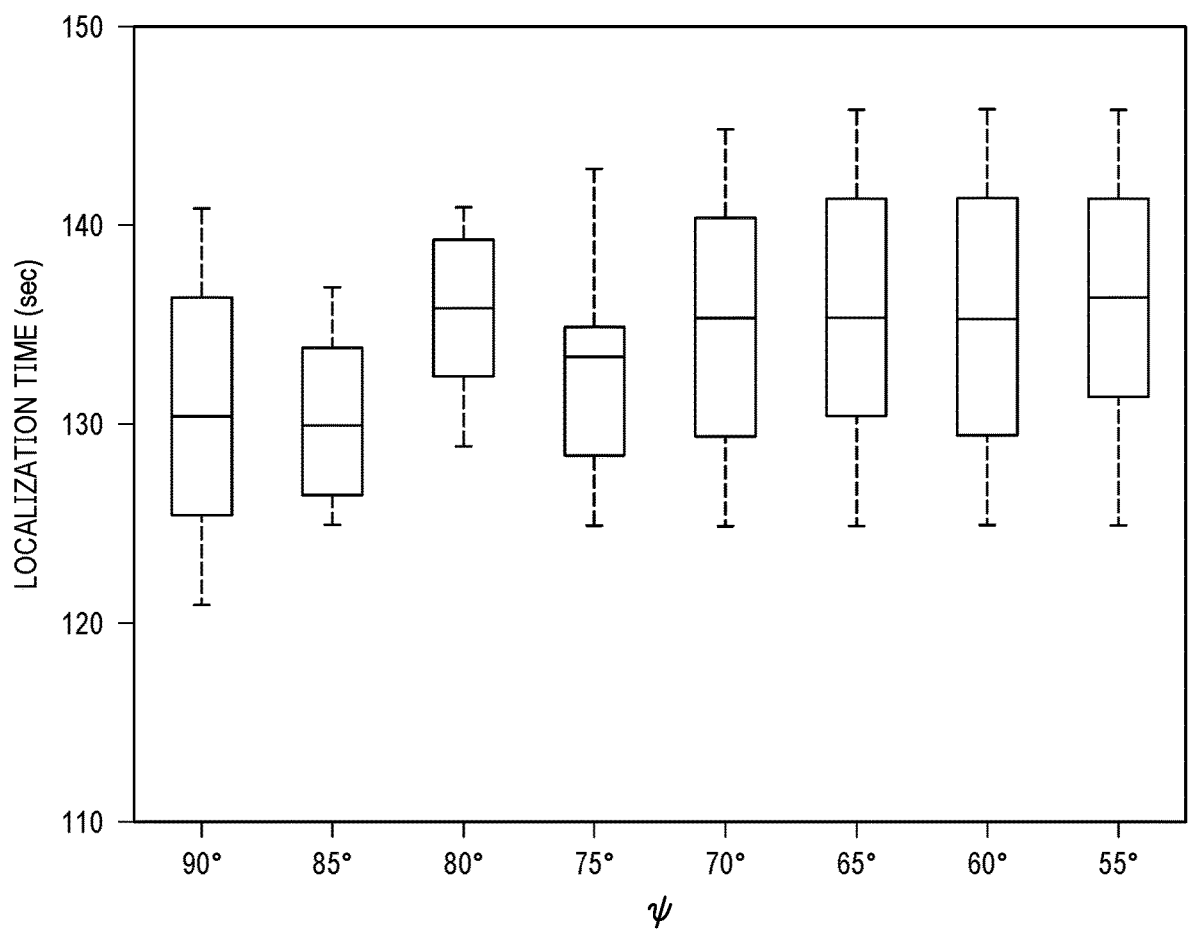
FIG. 19 shows the results of localization time obtained from several different initial angles ($\psi$).

FIG. 18 shows the localization errors for different initial angles. The localization error remains consistently small for different $\psi$. Specifically, the median localization error ranged from 5.7 to 8.0 cm, and the average localization error was just 5.2 cm. FIG. 19 presents the corresponding localization time. The median localization time ranged from 130 to 136 s. These results demonstrate that MotionCompass is robust to the change of the initial angle.

Impact of Movement Speed

Figure 20:
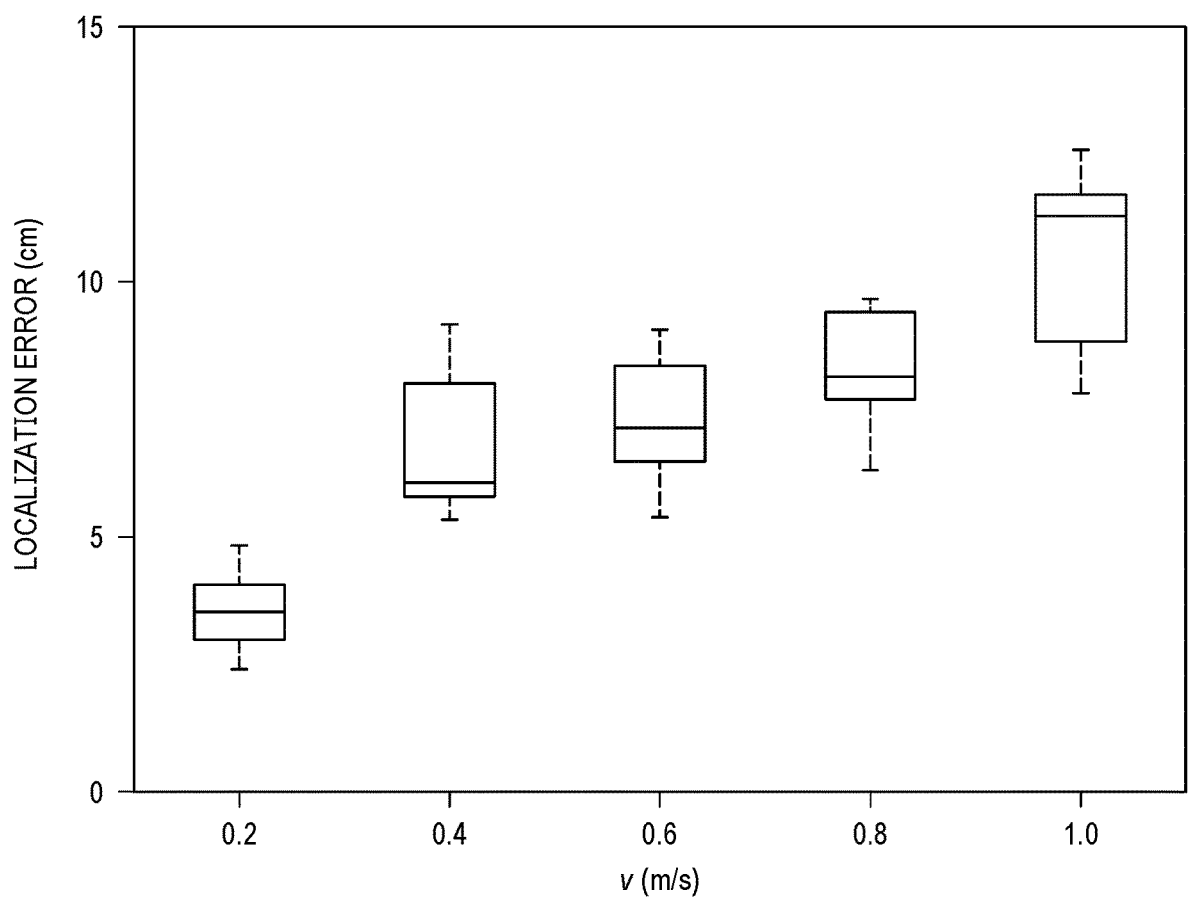
FIG. 20 shows the results of localization error obtained from several different user speeds ($\upsilon$).
Figure 21:
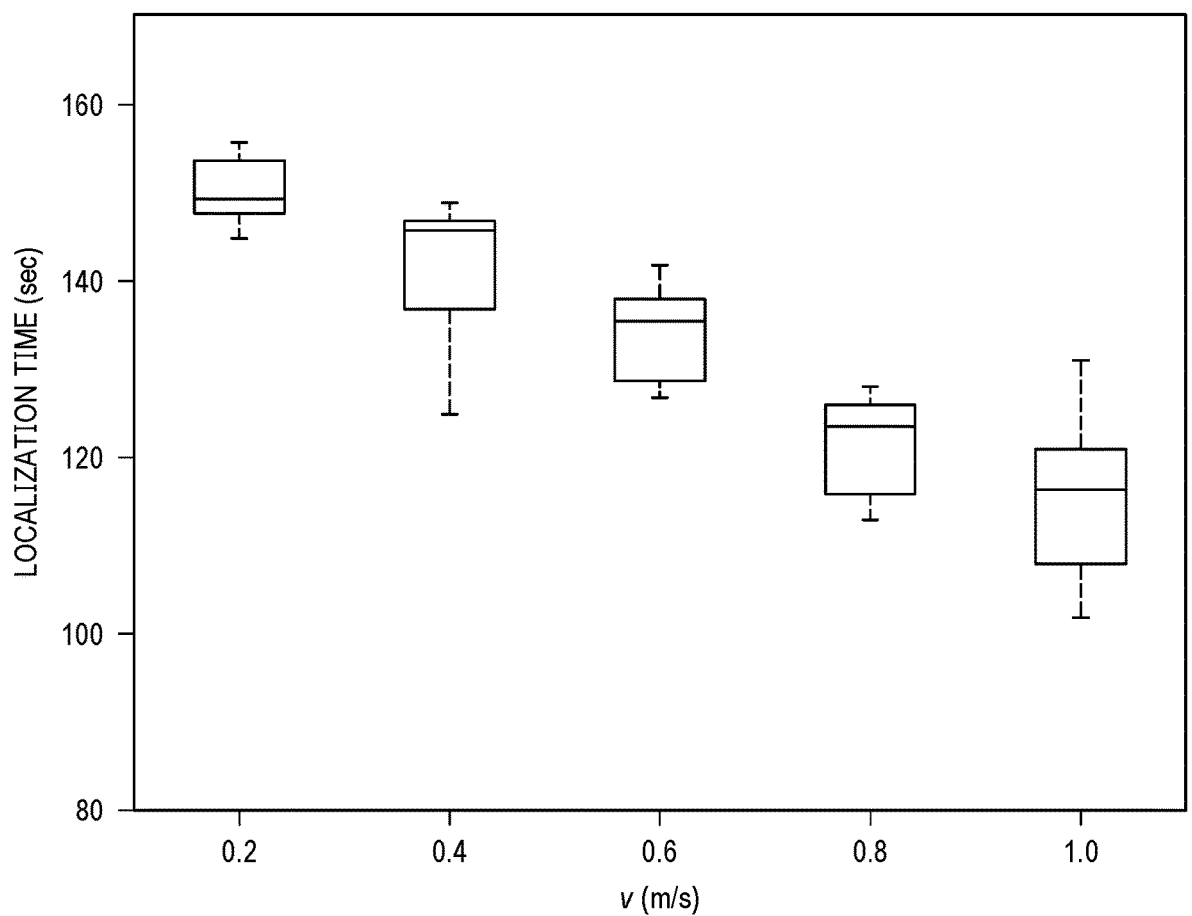
FIG. 21 shows the results of localization time obtained from several different user speeds ($\upsilon$).

The user's movement speed υ was changed from 0.2 m/s to 1.0 m/s, with increments of 0.2. For each υ, 10 attempts of MotionCompass were performed to localize the camera. FIG. 20 illustrates the localization errors when the movement speed is varied. We observed the localization error slightly increases with the value of υ, demonstrating the robustness of MotionCompass to the speed variation. Specifically, when υ=0.2 m/s, the mean localization error was 3.6 cm, while it increased to 10.7 cm for υ=1.0 m/s. This is because a higher speed would naturally result in larger error in distance measurement. On the other hand, with a higher speed, the localization can be finished in a shorter time. FIG. 21 shows the relationship between the localization time and the movement speed. We observed that the median localization time equals 150 s when υ is 0.2 m/s, and it dropped to 117 s when υ was increased to 1.0 m/s.

Overall Localization Performance

All cameras were tested in both indoor and outdoor environments. For localizing each camera at every selected location, we performed 25 trials. Thus, we had 18×2×5×25=4,500 attempts in total. For each attempt, we computed the localization error and recorded the time spent on finishing the task (i.e., localization time).

Figure 22:
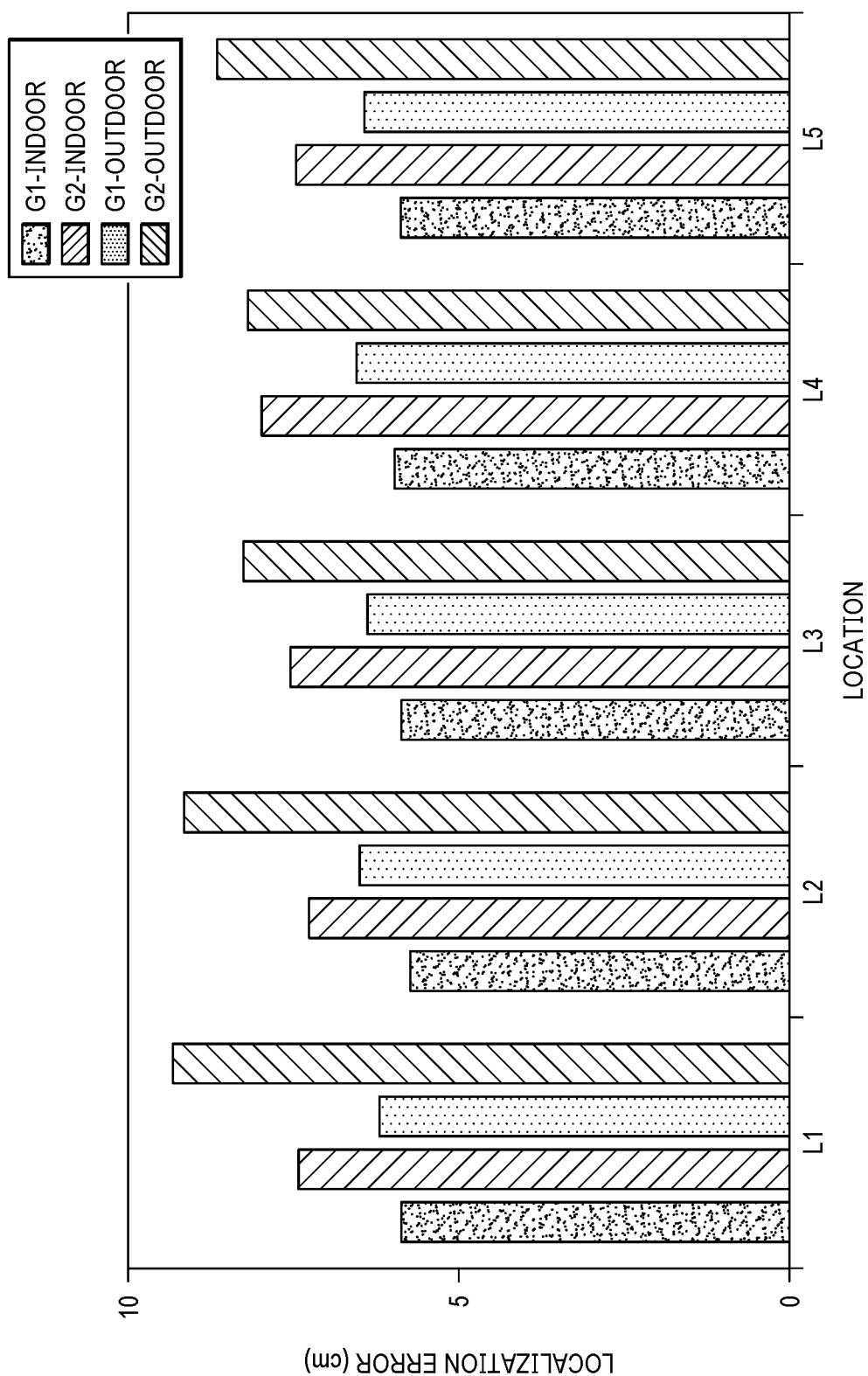
FIG. 22 shows the results of mean localization error obtained from outdoor and indoor cameras with one motion sensor (G1) vs two motion sensors (G2).
Figure 23:
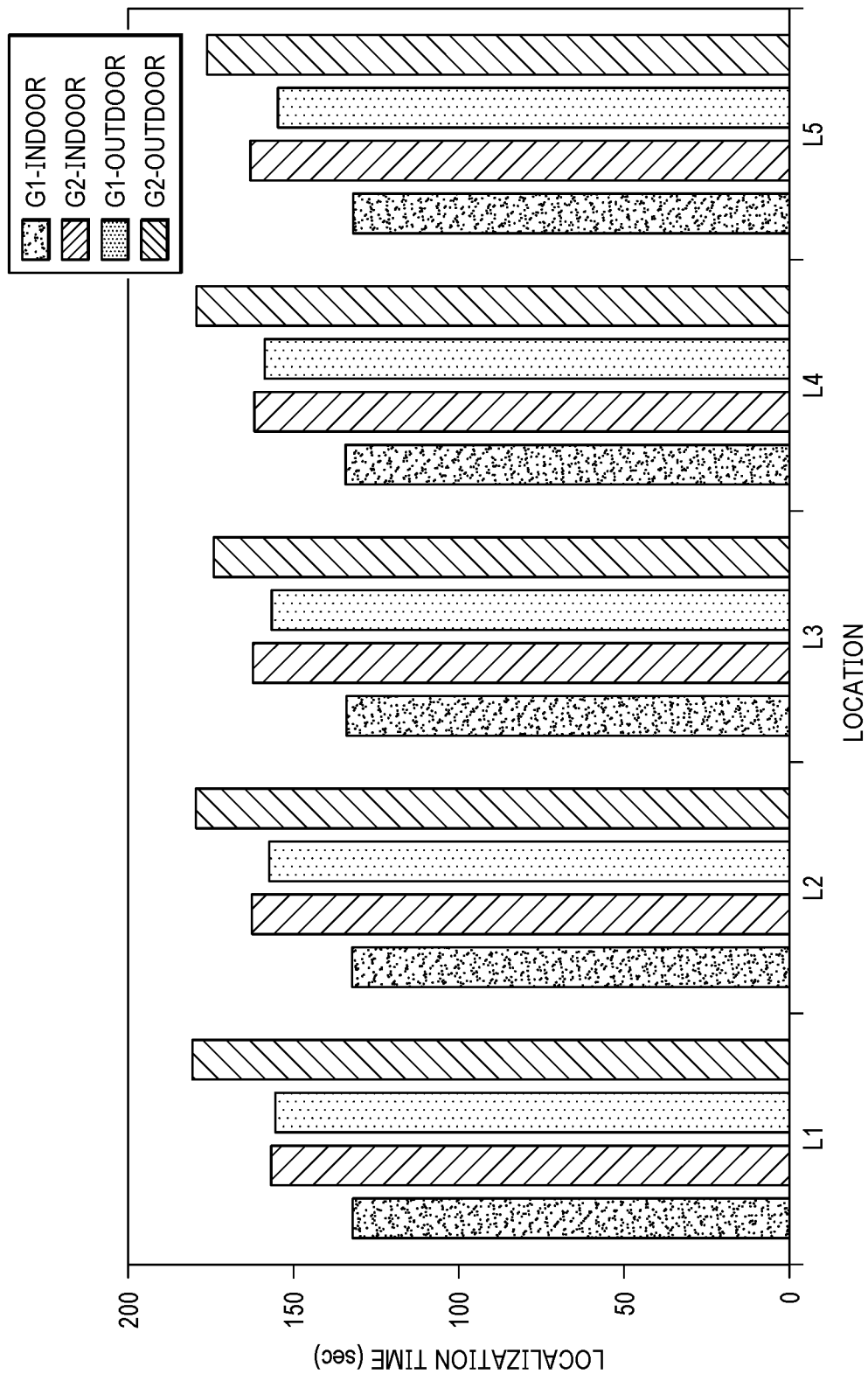
FIG. 23 shows the results of mean localization time obtained from outdoor and indoor cameras with one motion sensor (G1) vs two motion sensors (G2).

We computed the mean localization error and time for a camera in G1 (with one motion sensor) or G2 (with two motion sensors), as shown in FIGS. 22 and 23. We observed three tendencies. First, the performance was consistent across different locations in each environment. The mean localization error was always below 9.2 cm and the mean localization time stayed less than 178 s. Second, in both environments, on average, a camera in G2 caused a larger localization error and required longer localization time than a camera in G1. This was because a camera in G2 has a larger motion detection zone. The attacker thus had to walk longer to create the simulating motion. Also, a larger localization error may be introduced. Finally, for each group of cameras, the mean localization error was larger and the mean localization time was longer in outdoor an environment compared with an indoor environment. This appears to be due to the fact that the outdoor environment provides a wider space and the user may spend a longer time generating the simulating motion.

Figure 24:
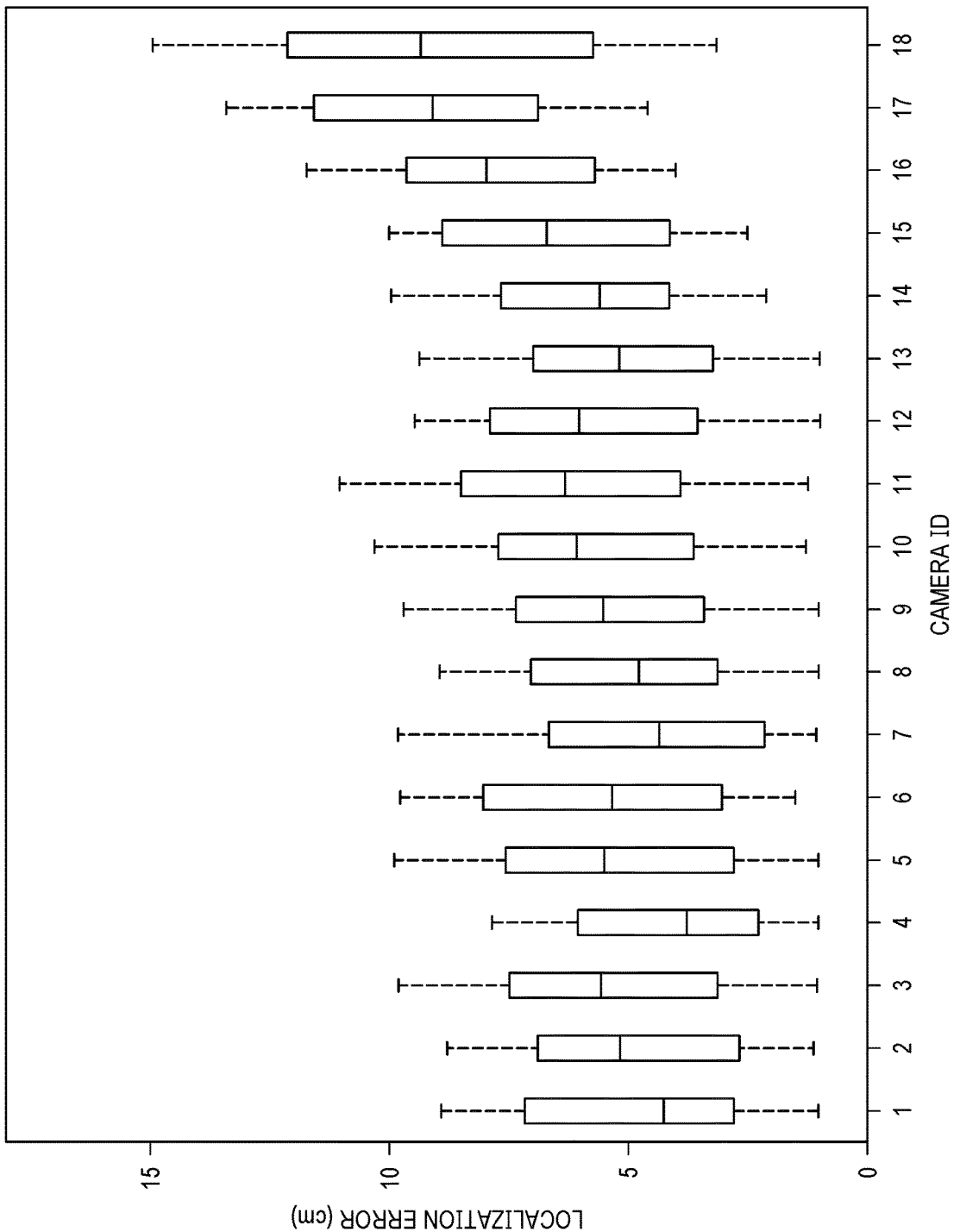
FIG. 24 shows the results of localization error obtained from outdoor cameras.
Figure 25:
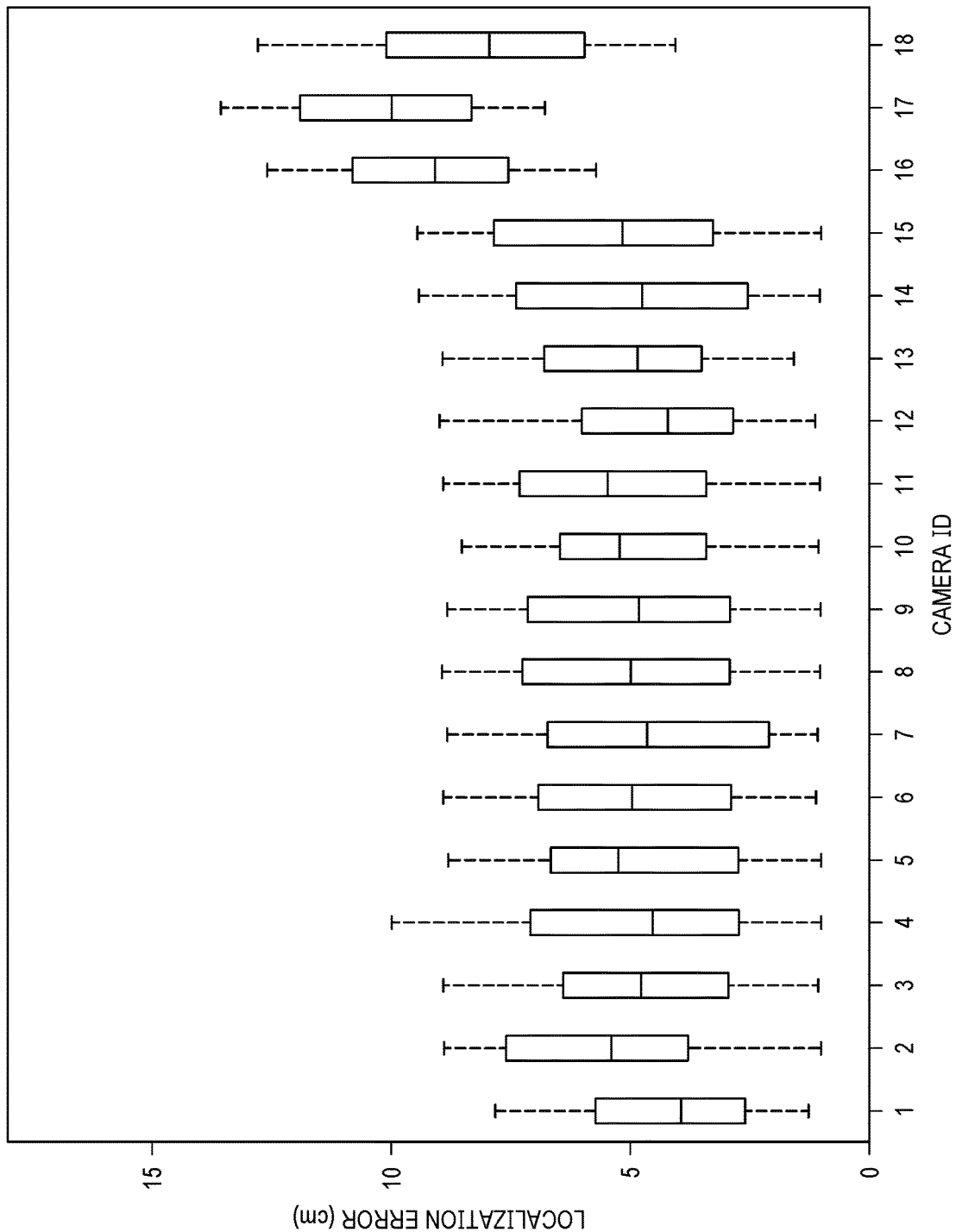
FIG. 25 shows the results of localization error obtained from indoor cameras.

FIGS. 24 and 25 show the localization errors for different cameras in the indoor and outdoor environments. We can see that for all cameras under both scenarios, a high localization accuracy could be always achieved. Specifically, in the outdoor environment, the median localization error had a range of 3.7 to 6.5 cm for cameras 1-15, and 7.8 to 9.2 cm for cameras 16-18. Meanwhile, MotionCompass was able to achieve a minimum localization error ranging from 1.0 to 2.3 cm for cameras 1-15, while for cameras 16-18, the achieved minimum localization error varied from 3.1 to 4.5 cm. In the indoor environment, the localization error was slightly smaller than that in the outdoor environment overall. These observations convincingly show MotionCompass works for different cameras in both environments, and cameras with two motion sensors cause slightly higher localization errors than cameras with one motion sensor.

Figure 26:
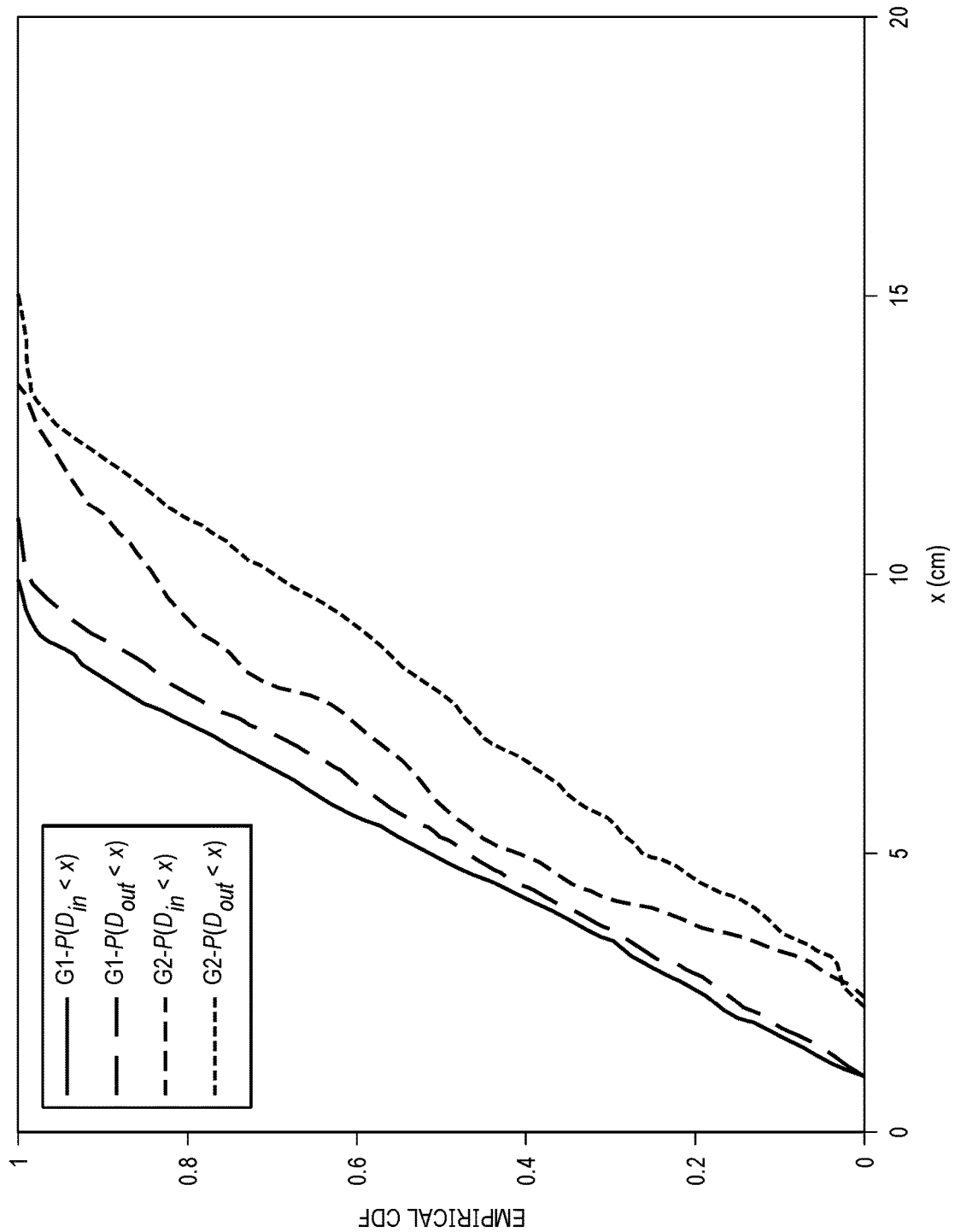
FIG. 26 plots cumulative distribution functions (CDFs) of the localization errors Din and Dout for different groups of cameras (G1 and G2) under indoor and outdoor environments.
Figure 27:
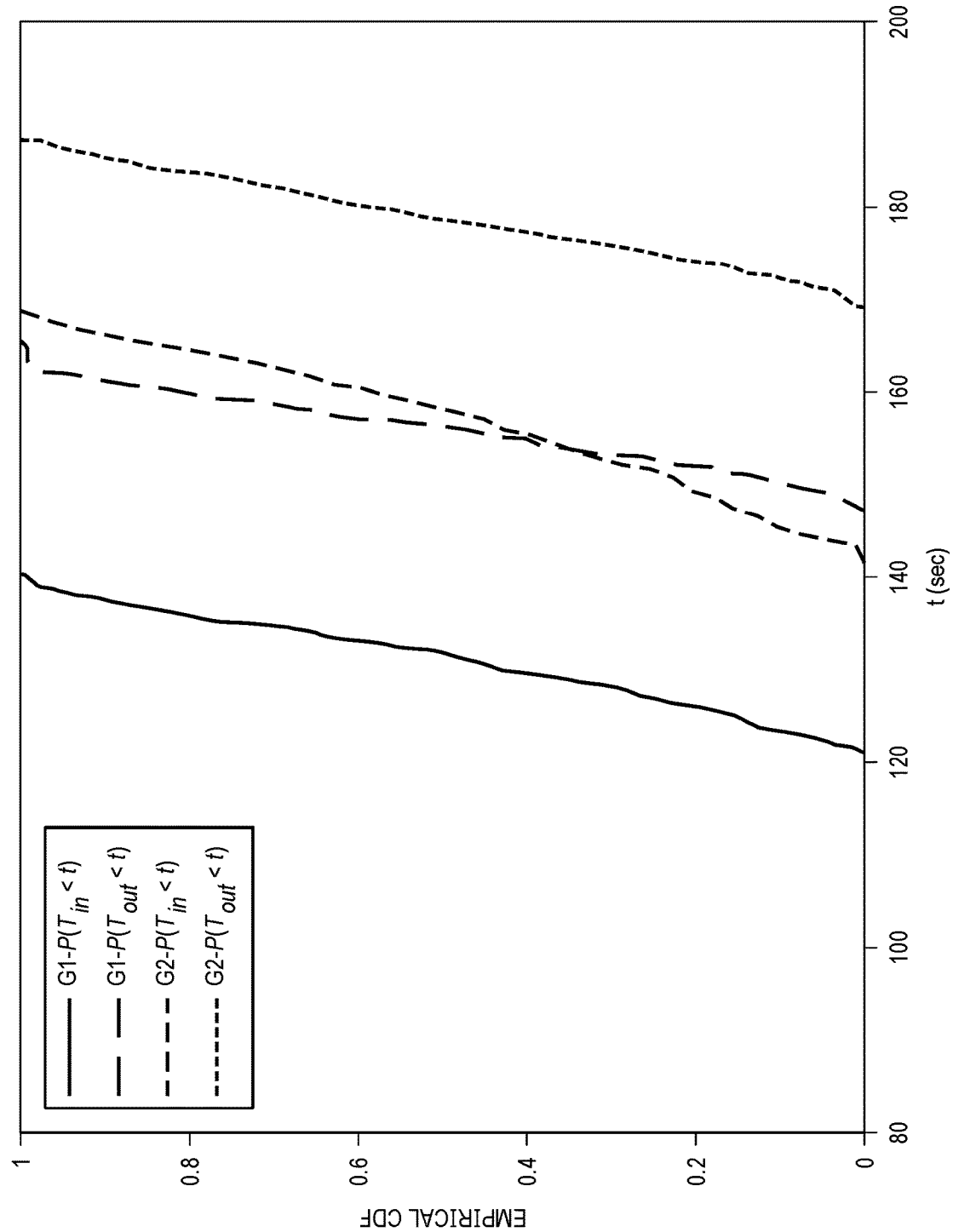
FIG. 27 plots cumulative distribution functions (CDFs) of the localization times Tin and Tout for different groups of cameras (G1 and G2) under indoor and outdoor environments.

FIG. 26 plots the empirical cumulative distribution functions (CDFs) of the localization errors $D_{in}$ and $D_{out}$ for different groups of cameras under indoor and outdoor environments. For cameras in G1, $D_{in}$ and $D_{out}$ were less than 9.0 cm with probabilities 98.1% and 92.0%; for cameras in G2, $D_{in}$ and $D_{out}$ were less than 12.0 cm with probabilities 94.5% and 88.8%. These results again demonstrate that the outdoor environment or more motion sensors may lead to a higher localization error, but also confirm conclusively that MotionCompass is robust against different environments and cameras. FIG. 27 plots CDFs of the localization time $T_{in}$ and $T_{out}$ for G1 and G2 under both environments. Overall, the outdoor environment or more motion sensors caused longer localization time. Specifically, $T_{in}$ and $T_{out}$ were less than 137 and 161 s with probability 90.0% for G1, and they were less than 166 and 185 s for G2 with the same probability.

Localization of Multiple Cameras

In some situations, there are multiple wireless cameras with overlapped fields of view in an area. The disclosed method monitors and analyzes the wireless traffic based on MAC addresses. Therefore, we can simultaneously monitor multiple traffic flows, each of which belongs to a corresponding wireless camera, and different cameras will not interfere with each other's localization.

To verify the effectiveness of pinpointing multiple cameras, we deployed different numbers (1 to 5) of cameras in the tested room. For multiple cameras, we manually adjusted their fields of view and made them partially overlapped. For each camera count, MotionCompass was launched for 25 attempts. We randomly changed the location of each camera every attempt. We found MotionCompass could successfully find each camera with a small localization error, similar to that we obtained for localizing a single camera. Table 3 shows the mean, minimum, and maximum localization times for different numbers of cameras. We observed that the localization time was almost proportional to the camera count, demonstrating that performing localization of multiple cameras equaled performing localization of a single camera for multiple times.

TABLE 3

Localization time vs. camera count.

| Camera count | Localization time (seconds) | | |
| --- | --- | --- | --- |
| | Average | Minimum | Maximum |
| 1 | 132 | 126 | 149 |
| 2 | 276 | 252 | 295 |
| 3 | 387 | 368 | 412 |
| 4 | 510 | 501 | 559 |
| 5 | 622 | 609 | 677 |

User Study

We recruited 5 volunteers and asked each of them to perform MotionCompass to identify the location of a hidden wireless camera randomly selected and deployed in the aforementioned outdoor or indoor environment. Every participant performed 25 attempts for each environment. For each deployment, we made sure that the camera's field of view was not obstructed by the wall and that it monitored an area that the participant could arrive at. We compared the localization result and the true location of the camera to quantify the localization error.

Figure 28A:
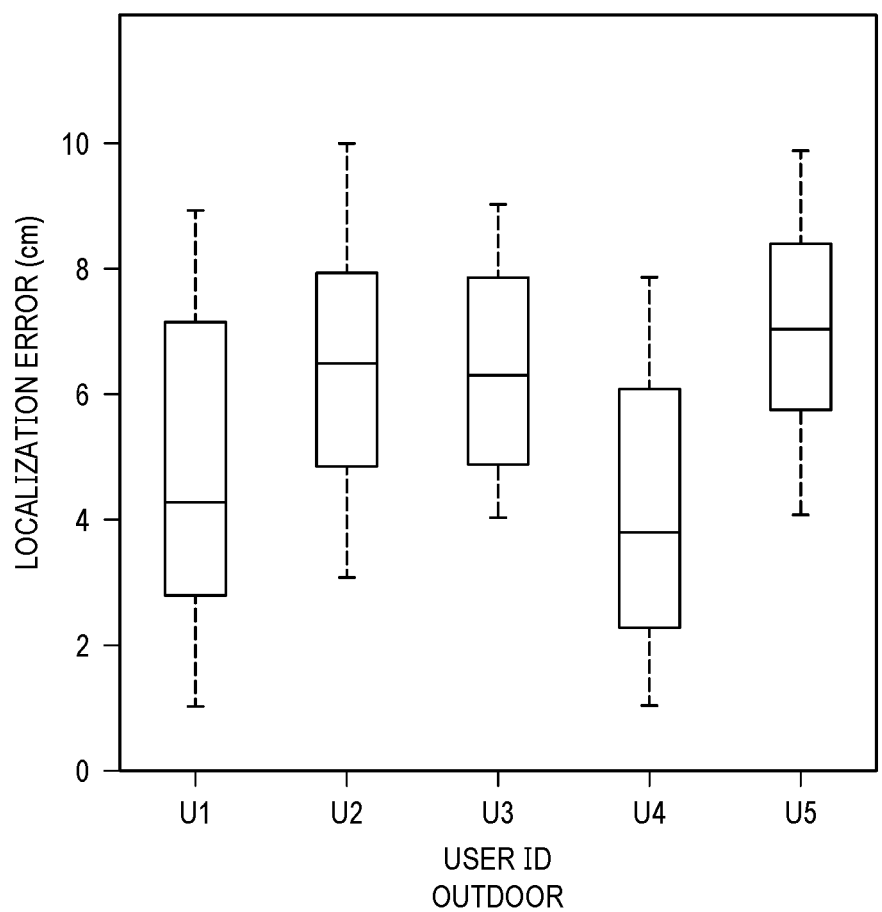
FIG. 28A shows results of localization errors for different users outdoors.
Figure 28B:
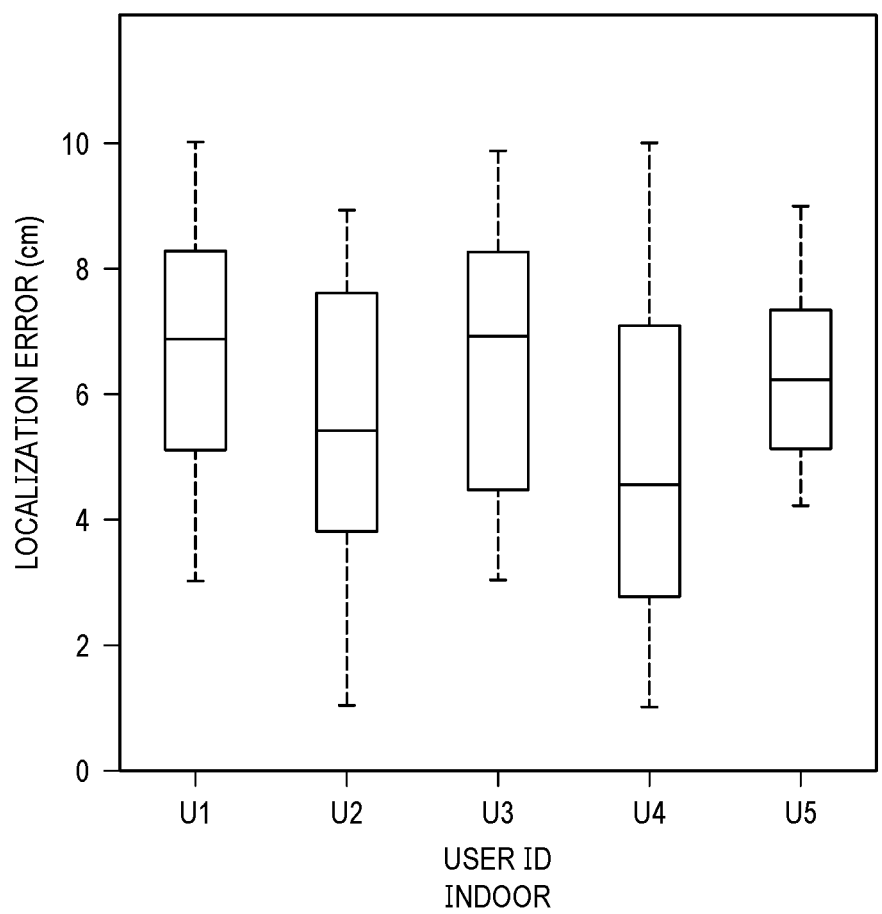
FIG. 28B shows results of localization errors for different users indoors.

FIG. 28 shows the obtained localization errors for different users under outdoor and indoor environments. We observed that the maximum localization error for each user was always below 10.0 cm, while for some users (e.g., user 2 in the indoor environment), a localization error of as small as 1.0 cm could be achieved. Meanwhile, in the outdoor environment, the mean localization error ranged from 3.8 to 7.0 cm for all users; and such a range became 4.5 to 6.9 cm in the indoor environment. These results demonstrated that the localization accuracy of MotionCompass is quite consistent among different users. Table 4 presents the mean, minimum, and maximum localization time for different users. We saw a consistent average localization time for all users varying between 135 and 143 s, indicating a user can normally localize the camera within less than 150 seconds. This verified the practicality of the disclosed camera localization strategy.

TABLE 4

Localization time for different users.

| User ID | Localization time (seconds) | | |
| --- | --- | --- | --- |
| | Average | Minimum | Maximum |
| U1 | 135 | 129 | 146 |
| U2 | 141 | 130 | 147 |
| U3 | 143 | 133 | 152 |
| U4 | 137 | 128 | 145 |
| U5 | 140 | 127 | 151 |

Other Applications

The disclosed system can be used for applications other than detecting hidden wireless cameras including, but not limited to, traffic analysis, which can achieve various applications, including detecting drones, inferring apps, monitoring misbehaving apps, enforcing network access restrictions, and identifying actions on apps. Unlike existing traffic analysis-based approaches, which utilize the inherent traffic patterns (side-channel information leaks) to detect devices or apps which generate them, the presently disclosed system correlates the traffic pattern with human activities.

EMBODIMENTS

Figure 29:
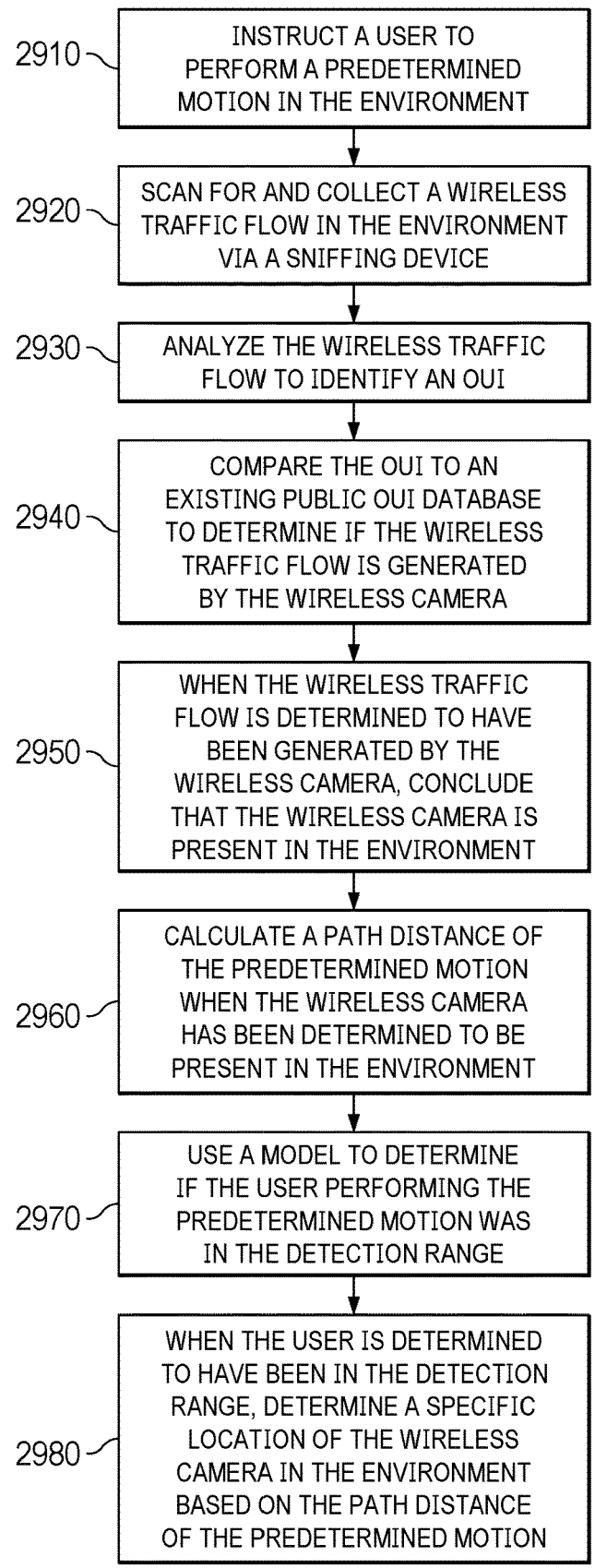
FIG. 29 is a flowchart of a method for determining locations of wireless cameras.

FIG. 29 is a flowchart of a method 2900 for determining locations of wireless cameras. At step 2910, a user is instructed to perform a predetermined motion in the environment. The predetermined motion is detectable within a detection range of a motion sensor of the wireless camera. At step 2920, a wireless traffic flow in the environment is scanned for and collected via a sniffing device. At step 2930, the wireless traffic flow is analyzed to identify an OUI. At step 2940, the OUI is compared to an existing public OUI database to determine if the wireless traffic flow is generated by the wireless camera. At step 2950, when the wireless traffic flow is determined to have been generated by the wireless camera, it is concluded that the wireless camera is present in the environment. At step 2960, a path distance of the predetermined motion is calculated when the wireless camera has been determined to be present in the environment. At step 2970, a model is used to determine if the user performing the predetermined motion was in the detection range. At step 2980, when the user is determined to have been in the detection range, a specific location of the wireless camera in the environment is determined based on the path distance of the predetermined motion.

Figure 30:
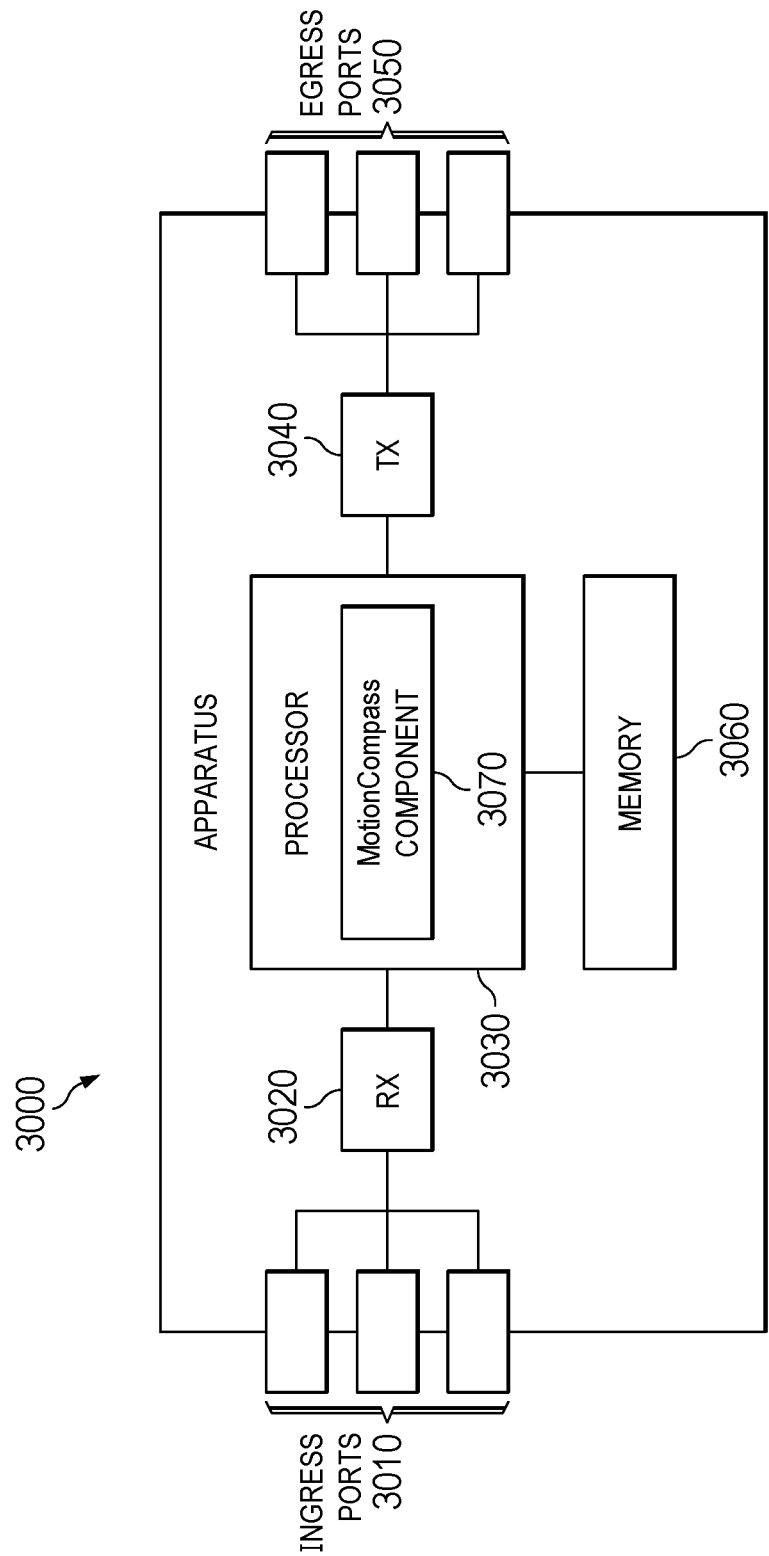
FIG. 30 is a schematic diagram of an apparatus.

FIG. 30 is a schematic diagram of an apparatus 3000. The apparatus 3000 may implement the disclosed embodiments. The apparatus 3000 comprises ingress ports 3010 and a receiver unit (RX) 3020 to receive data; a processor 3030, or logic unit, baseband unit, or central processing unit (CPU), to process the data; a transmitter unit (TX) 3040 and egress ports 3050 to transmit the data; and a memory 3060 to store the data. The apparatus 3000 may also comprise optical-to-electrical (OE) components, electrical-to-optical (EO) components, or radio frequency (RF) components coupled to the ingress ports 3010, the RX 3020, the TX 3040, and the egress ports 3050 to provide ingress or egress of optical signals, electrical signals, or RF signals.

The processor 3030 is any combination of hardware, middleware, firmware, or software. The processor 3030 comprises any combination of one or more CPU chips, cores, field-programmable gate arrays (FPGAs), application-specific integrated circuits (ASICs), or digital signal processors (DSPs). The processor 3030 communicates with the ingress ports 3010, the RX 3020, the TX 3040, the egress ports 3050, and the memory 3060. The processor 3030 comprises a MotionCompass component 3070, which implements the disclosed embodiments. The inclusion of the MotionCompass component 3070, therefore, provides a substantial improvement to the functionality of the apparatus 3000 and effects a transformation of the apparatus 3000 to a different state. Alternatively, the memory 3060 stores the MotionCompass component 30970 as instructions, and the processor 3030 executes those instructions.

The memory 3060 comprises any combination of disks, tape drives, or solid-state drives. The apparatus 3000 may use the memory 3060 as an overflow data storage device to store programs when the apparatus 3000 selects those programs for execution and to store instructions and data that the apparatus 3000 reads during execution of those programs. The memory 3060 may be volatile or non-volatile and may be any combination of read-only memory (ROM), random-access memory (RAM), ternary content-addressable memory (TCAM), or static RAM (SRAM).

A computer program product may comprise computer-executable instructions that are stored on a computer-readable medium and that, when executed by a processor, cause an apparatus to perform any of the embodiments. The non-transitory medium may be the memory 3060, the processor may be the processor 3030, and the apparatus may be the apparatus 3000.

Where single components, apparatuses, or systems are described as performing functions, multiple such components, apparatuses, or systems may implement the functions. It will be understood from the foregoing description that various modifications and changes may be made in the various embodiments of the present disclosure without departing from their true spirit. Similarly, changes may be made in the devices and components, systems, and methods described herein, or in the steps or the sequence of steps of the methods described herein without departing from the spirit and scope of the present disclosure. The description provided herein is intended for purposes of illustration only and is not intended to be construed in a limiting sense. Thus, while the present disclosure has been described herein in connection with certain embodiments so that aspects thereof may be more fully understood and appreciated, it is not intended that the present disclosure be limited to these particular embodiments. On the contrary, it is intended that all alternatives, modifications and equivalents are included within the scope of the inventive concepts as defined herein. Thus, the examples described above, which include particular embodiments, will serve to illustrate the practice of the present disclosure, it being understood that the particulars shown are by way of example and for purposes of illustrative discussion of particular embodiments only and are presented in the cause of providing what is believed to be a useful and readily understood description of procedures as well as of the principles and conceptual aspects of the inventive concepts.

What is claimed is:

1. A method for detecting and localizing a wireless camera in an environment suspected to contain the wireless camera, the method comprising:
   instructing a user to perform a predetermined motion in the environment, wherein the predetermined motion is detectable within a detection range of a motion sensor of the wireless camera;
   scanning for and collecting a wireless traffic flow in the environment via a sniffing device;
   analyzing the wireless traffic flow to identify an organizationally unique identifier (OUI);
   comparing the OUI to an existing public OUI database to determine if the wireless traffic flow is generated by the wireless camera;
   when the wireless traffic flow is determined to have been generated by the wireless camera, concluding that the wireless camera is present in the environment;
   calculating a path distance of the predetermined motion when the wireless camera has been determined to be present in the environment;
   using a model to determine if the user performing the predetermined motion was in the detection range; and
   when the user is determined to have been in the detection range, determining a specific location of the wireless camera in the environment based on the path distance of the predetermined motion.

2. The method of claim 1, wherein the sniffing device is a smartphone or a computing device which runs a traffic sniffing program.

3. The method of claim 1, wherein the OUI is a media access control (MAC) address.

4. The method of claim 1, further comprising:
   inputting physical parameters and measurements of the environment into the model;
   displaying a scanning plan; and
   prompting the user to perform the predetermined motion to activate the wireless camera.

5. The method of claim 1, wherein the environment is an interior of a building.

6. The method of claim 1, wherein the environment is an exterior of a building.

7. The method of claim 1, wherein the environment comprises a plurality of wireless devices connected wirelessly, and wherein the wireless devices are secured by a password unknown to the user.

8. A system comprising:
   a memory; and
   a processor coupled to the memory and configured to:
      instruct a user to perform a predetermined motion in an environment suspected to contain a wireless camera, wherein the predetermined motion is detectable within a detection range of a motion sensor of the wireless camera;
      scan for and collect a wireless traffic flow in the environment via a sniffing device;
      analyze the wireless traffic flow to identify an organizationally unique identifier (OUI);
      compare the OUI to an existing public OUI database to determine if the wireless traffic flow is generated by the wireless camera;
      when the wireless traffic flow is determined to have been generated by the wireless camera, conclude that the wireless camera is present in the environment;
      calculate a path distance of the predetermined motion when the wireless camera has been determined to be present in the environment;
      use a model to determine if the user performing the predetermined motion was in the detection range; and
      when the user is determined to have been in the detection range, determine a specific location of the wireless camera in the environment based on the path distance of the predetermined motion.

9. The system of claim 8, wherein the sniffing device is a smartphone or a computing device which runs a traffic sniffing program.

10. The system of claim 8, wherein a plurality of devices implements the system, and wherein the devices comprise the sniffing device.

11. The system of claim 8, wherein the OUI is a media access control (MAC) address.

12. The system of claim 8, wherein the processor is further configured to:
   input physical parameters and measurements of the environment into the model;
   display a scanning plan; and
   prompt the user to perform the predetermined motion to activate the wireless camera.

13. The system of claim 8, wherein the environment is an interior of a building.

14. The system of claim 8, wherein the environment is an exterior of a building.

15. The system of claim 8, wherein the environment comprises a plurality of wireless devices connected wirelessly, and wherein the wireless devices are secured by a password unknown to the user.

16. A computer program product comprising instructions that are stored on a computer-readable medium and that, when executed by a processor, cause a system to:
   instruct a user to perform a predetermined motion in an environment suspected to contain a wireless camera, wherein the predetermined motion is detectable within a detection range of a motion sensor of the wireless camera;
   scan for and collect a wireless traffic flow in the environment via a sniffing device;
   analyze the wireless traffic flow to identify an organizationally unique identifier (OUI);
   compare the OUI to an existing public OUI database to determine if the wireless traffic flow is generated by the wireless camera;
   when the wireless traffic flow is determined to have been generated by the wireless camera, conclude that the wireless camera is present in the environment;
   calculate a path distance of the predetermined motion when the wireless camera has been determined to be present in the environment;
   use a model to determine if the user performing the predetermined motion was in the detection range; and
   when the user is determined to have been in the detection range, determine a specific location of the wireless camera in the environment based on the path distance of the predetermined motion.

17. The computer program product of claim 16, wherein the sniffing device is a smartphone or a computing device which runs a traffic sniffing program.

18. The computer program product of claim 16, wherein the OUI is a media access control (MAC) address.

19. The computer program product of claim 16, wherein the instructions, when executed by the processor, further cause the system to:
   input physical parameters and measurements of the environment into the model;
   display a scanning plan; and
   prompt the user to perform the predetermined motion to activate the wireless camera.

20. The computer program product of claim 16, wherein the environment is an interior of a building or an exterior of the building, wherein the environment comprises a plurality of wireless devices connected wirelessly, and wherein the wireless devices are secured by a password unknown to the user.

* * * * *